(12) United States Patent
Takeuchi

(10) Patent No.: US 10,960,553 B2
(45) Date of Patent: Mar. 30, 2021

(54) ROBOT CONTROL DEVICE AND ROBOT SYSTEM

(71) Applicant: Seiko Epson Corporation, Tokyo (JP)

(72) Inventor: Kaoru Takeuchi, Azumino (JP)

(73) Assignee: Seiko Epson Corporation

( * ) Notice: Subject to any disclaimer, the term of this patent is extended or adjusted under 35 U.S.C. 154(b) by 126 days.

(21) Appl. No.: 16/419,185

(22) Filed: May 22, 2019

(65) Prior Publication Data
US 2019/0358824 A1 Nov. 28, 2019

(30) Foreign Application Priority Data
May 23, 2018 (JP) .............................. JP2018-098507

(51) Int. Cl.
*B25J 13/08* (2006.01)
*B25J 9/16* (2006.01)

(52) U.S. Cl.
CPC ............. *B25J 13/085* (2013.01); *B25J 9/161* (2013.01); *B25J 9/1612* (2013.01); *B25J 9/1633* (2013.01); *B25J 9/1694* (2013.01)

(58) Field of Classification Search
CPC ........ B25J 13/085; B25J 9/161; B25J 9/1633; B25J 9/1694; B25J 9/1612; B25J 13/06
USPC .................................................. 700/245, 260
See application file for complete search history.

(56) References Cited

U.S. PATENT DOCUMENTS

| 8,498,745 | B2* | 7/2013 | Umetsu | B25J 9/1697 700/254 |
| 8,798,790 | B2* | 8/2014 | Kamiya | G05B 19/401 700/245 |
| 9,434,073 | B2* | 9/2016 | Matsumoto | B25J 9/1633 |
| 9,505,129 | B2* | 11/2016 | Yamamoto | B25J 9/1676 |
| 10,369,700 | B2* | 8/2019 | Kuroda | A61B 90/361 |
| 10,406,685 | B1* | 9/2019 | Wilson | B25J 9/163 |
| 2007/0021868 | A1 | 1/2007 | Nagatsuka et al. | |
| 2013/0061695 | A1* | 3/2013 | Sato | G01L 5/009 73/865 |
| 2013/0184868 | A1* | 7/2013 | Inazumi | B25J 9/1605 700/258 |
| 2014/0107843 | A1* | 4/2014 | Okazaki | B66C 23/005 700/260 |
| 2014/0156066 | A1* | 6/2014 | Sakano | B25J 9/1633 700/245 |
| 2015/0158181 | A1* | 6/2015 | Kawamura | B25J 9/1697 700/259 |

(Continued)

FOREIGN PATENT DOCUMENTS

JP 2007-054942 A 3/2007

*Primary Examiner* — Jaime Figueroa
(74) *Attorney, Agent, or Firm* — Harness, Dickey & Pierce, P.L.C.

(57) ABSTRACT

A robot control device includes a processor that is configured to calculate, based on magnitude of a target force in force control performed based on an output of a force sensor, a direction of the target force, a position where the force control is started, a posture in which the force control is started, and peculiar information including values of a plurality of allowable torques corresponding to a plurality of joints included in the robot, values of a plurality of torques generated in the plurality of joints when the force control is executed at the magnitude of the target force and in the direction of the target force in the position where the force control is started and the posture in which the force control is started.

11 Claims, 15 Drawing Sheets

(56) References Cited

U.S. PATENT DOCUMENTS

| | | | |
|---|---|---|---|
| 2016/0052135 A1* | 2/2016 | Motoyoshi | B25J 9/1633 29/281.6 |
| 2017/0080562 A1* | 3/2017 | Tsuzaki | B25J 9/1633 |
| 2018/0093379 A1* | 4/2018 | Shimodaira | B25J 9/1679 |
| 2018/0281185 A1* | 10/2018 | Toshimitsu | B25J 15/02 |
| 2018/0281186 A1* | 10/2018 | Hiraide | B25J 9/1633 |
| 2019/0365489 A1* | 12/2019 | Kasai | A61B 1/05 |

* cited by examiner

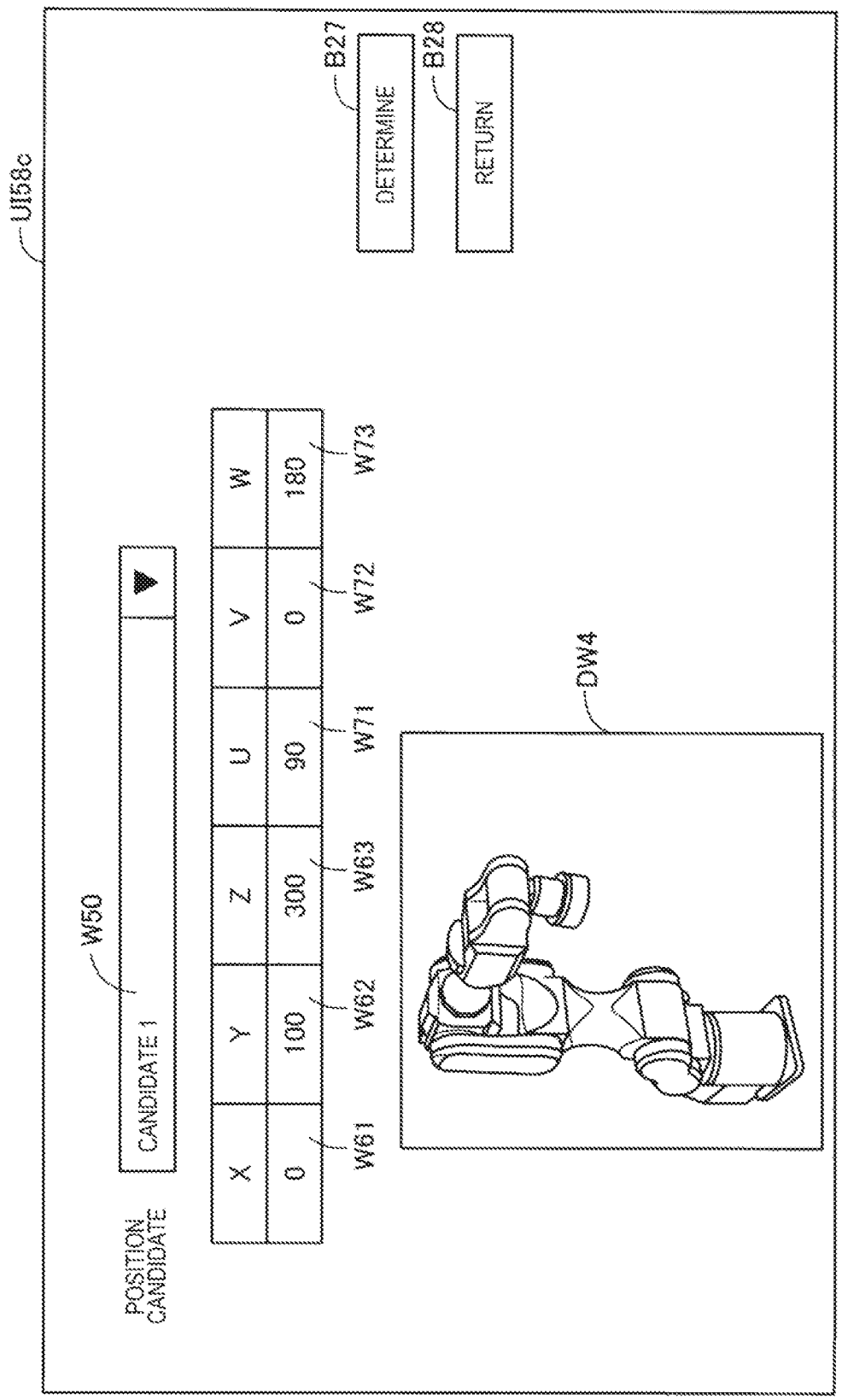

ROBOT CONTROL DEVICE AND ROBOT SYSTEM

The present application is based on, and claims priority from JP Application Serial Number 2018-098507, filed May 23, 2018, the disclosure of which is hereby incorporated by reference herein in its entirety.

BACKGROUND

1. Technical Field

The present disclosure relates to setting of the operation of a robot that performs force control.

2. Related Art

As described in JP-A-2007-54942 (Patent Literature 1), there has been a device that calculates, through a simulation, a load of a motor for driving a robot and evaluates whether the load of the motor exceeds an allowable value.

However, the technique described above does not assume that the device causes the robot to perform force control. Therefore, the device cannot evaluate the load applied to the motor including a load caused by the force control. As a result, with the technique, the device cannot determine whether the device can cause the robot to execute certain force control.

With the technique, the device cannot evaluate the load applied to the motor of the robot. Therefore, a user cannot learn in advance whether the position of the robot allows execution of the force control.

SUMMARY

An advantage of some aspects of the present disclosure is to solve at least a part of the problems. The present disclosure can be implemented as the following aspect or application example.

According to an aspect of the present disclosure, there is provided a robot control device that controls operation of a robot including a force detecting section that detects magnitude of a force applied from an outside. The robot control device includes: a receiving section configured to receive magnitude of a target force in force control performed based on an output of the force detecting section, a direction of the target force, a position at a time when the force control is started, and a posture at the start time of the force control; a storing section having stored therein peculiar information concerning a configuration of the robot, the peculiar information including values of allowable torques of one or more joints included in the robot; a calculating section configured to calculate, based on the magnitude and the direction of the target force, the position and the posture at the start time of the force control, and the peculiar information, values of torques generated in the respective joints included in the robot when the force control is executed at the magnitude and in the direction of the target force in the position and the posture at the start time of the force control; and an output control section configured to output information of a first type when, concerning all the joints included in the robot, the values of the torques generated in the joints are equal to or smaller than the values of the allowable torques and output information of a second type different from the information of the first type when the joint in which the value of the torque generated in the joint exceeds the value of the allowable torque is present.

BRIEF DESCRIPTION OF THE DRAWINGS

FIG. 16 is a diagram showing a user interface replacing the user interface in step S580 in FIG. 9.

DESCRIPTION OF EXEMPLARY EMBODIMENTS

A. First Embodiment

A1. Configuration of a Robot System

Figure 1:
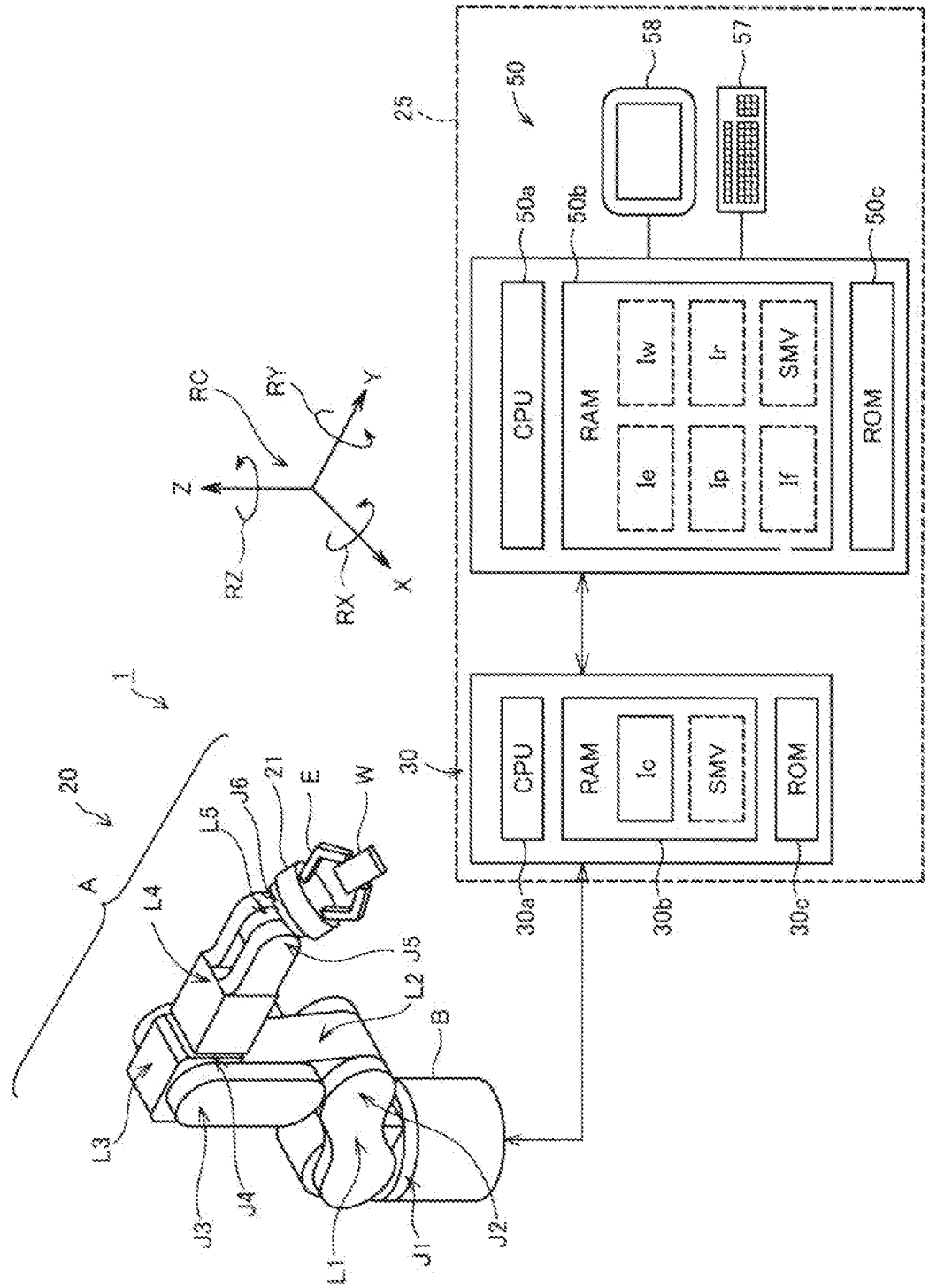
FIG. 1 is a diagram showing the configuration of a robot system according to an embodiment.

FIG. 1 is a diagram showing the configuration of a robot system 1 according to a first embodiment. The robot system 1 includes a robot 20 and a robot control device 25. The robot control device 25 controls the robot 20. The robot control device 25 is configured by an operation control device 30 and a teaching device 50.

The operation control device 30 controls an arm A of the robot 20 such that a target force is realized in a target position set by teaching work by a user. The operation control device 30 includes a CPU (Central Processing Unit) 30*a*, which is a processor, a RAM (Random Access Memory) 30*b*, and a ROM (Read-Only Memory) 30*c*. A control program for performing control of a robot 20 is installed in the operation control device 30. In the operation control device 30, the hardware resources and the control program cooperate. Functions of the operation control device 30 are explained in detail below.

The teaching device 50 teaches a target position St and a target force fst to the operation control device 30. The teaching device 50 includes a CPU 50a, a RAM 50b, and a ROM 50c. A teaching program for teaching the target position St and the target force fst to the operation control device 30 is installed in the teaching device 50. In the teaching device 50, the hardware resources and the teaching program cooperate.

The teaching device 50 further includes an input device 57 and an output device 58. The input device 57 is, for example, a mouse, a keyboard, or a touch panel. The input device 57 receives an instruction from the user. The output device 58 is, for example, a display or a speaker. The output device 58 outputs various kinds of information to the user. Functions of the teaching device 50 are explained in detail below.

The robot 20 is a single-arm robot including the arm A and a supporting stand B that supports the arm A. The arm A is an arm of a six-axis vertical articulated type. The arm A includes links L1 to L5, which are five arm members, and joints J1 to J6, which are six joints. The joints J2, J3, and J5 are bending joints and the joints J1, J4, and J6 are torsion joints.

The supporting stand B and the link L1 are connected via the joint L1. The link L1 and the link L2 are connected via the joint J2. The link L2 and the link L3 are connected via the joint J3. The link L3 and the link L4 are connected via the joint J4. The link L4 and the link L5 are connected via the joint J5. The link L5 and a force detecting section 21 and an end effector E are connected via the joint J6.

The end effector E is attached to the distal end of the arm A via the force detecting section 21. The end effector E is a device for gripping work W, which is a target object processed by the robot 20. The position of the end effector E is defined by a TCP (Tool Center Point). In this embodiment, the TCP is present on a rotation axis of the joint J6. The operation control device 30 drives the arm A to thereby control the position of the TCP serving as a control point in a robot coordinate system RC.

The force detecting section 21 is a six-axis force sensor that can detect the magnitude of a force applied from the outside. The force detecting section 21 detects the magnitudes of forces on three detection axes orthogonal to one another and the magnitudes of torques around the three detection axes.

In this embodiment, a coordinate system for specifying a space in which the robot 20 is set is represented as a robot coordinate system RC based on the position of the supporting stand B. The robot coordinate system RC is a three-dimensional orthogonal coordinate system defined by an X axis and a Y axis orthogonal to each other on the horizontal plane and a Z axis, a positive direction of which is the vertical upward direction. In this specification, when the "X axis" is simply referred to, the "X axis" represents the X axis in the robot coordinate system RC. When the "Y axis" is simply referred to, the "Y axis" represents the Y axis in the robot coordinate system RC. When the "Z axis" is simply referred to, the "Z axis" represents the Z axis in the robot coordinate system RC. Any position in the robot coordinate system RC can be defined by a position DX in an X-axis direction, a position DY in a Y-axis direction, and a position DZ in a Z-axis direction.

In this embodiment, rotation around the X axis is represented by an angle position RX. Rotation around the Y axis is represented by an angle position RY. Rotation around the Z axis is represented by an angle position RZ. Any posture in the robot coordinate system RC can be represented by the angle position RX around the X axis, the angle position RY around the Y axis, and the angle position RZ around the Z axis.

In this specification, the representation "position" can mean a posture in addition to a position in a narrow sense. The representation "force" can mean torques acting in respective rotating directions in the angle position RX, the angle position RY, and the angle position RZ in addition to a force in a narrow sense specified by a direction and magnitude in a three-dimensional space.

The arm A, the force detecting section 21, and the end effector E are communicably connected to the operation control device 30 by a cable.

A2. Operation Control by the Operation Control Device 30

Figure 2:
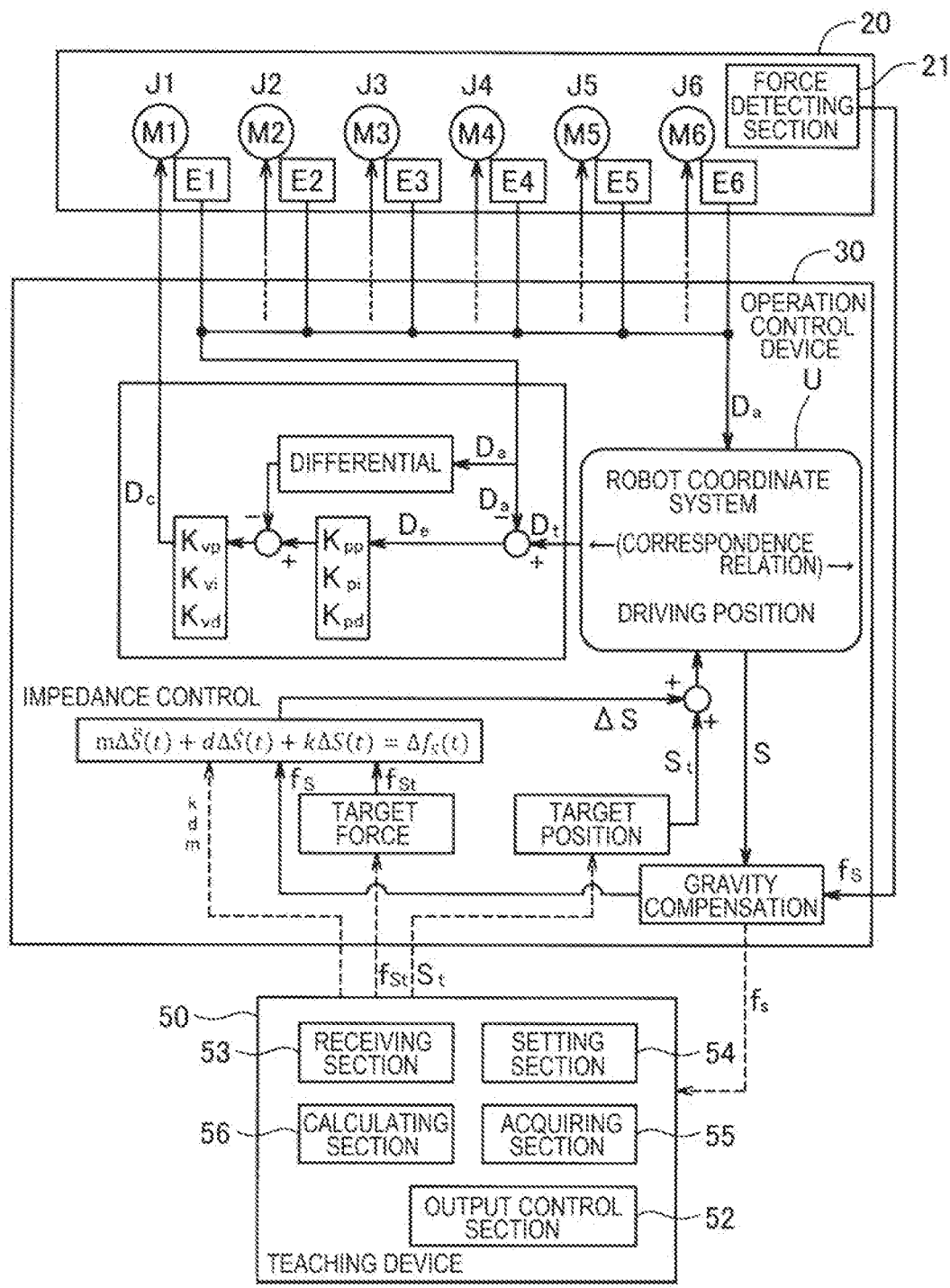
FIG. 2 is a diagram showing a functional configuration of a robot, an operation control device, and a teaching device.

FIG. 2 is a diagram showing a functional configuration of the robot 20, the operation control device 30, and the teaching device 50. S shown in FIG. 2 represents one direction among the directions of the axes specifying the robot coordinate system RC (the X-axis direction, the Y-axis direction, the Z-axis direction, the direction of the angle position RX, the direction of the angle position RY, and the direction of the angle position RZ). For example, when the direction represented by S is the X-axis direction, an X-axis direction component of a target position set in the robot coordinate system RC is represented as St=Xt and an X-axis direction component of a target force is represented as fst=fXt. S also represents a position along the axis in the direction represented by S.

The robot 20 includes motors M1 to M6 functioning as driving sections and encoders E1 to E6 respectively in the joints J1 to J6 (see an upper part in FIG. 2). The motor M1 and the encoder E1 are included in the joint J1. The motor M1 drives the joint J1. The encoder E1 detects a driving position of the motor M1. The motors M2 to M6 and the encoders E2 to E6 perform the same function in the joints J2 to J6.

The operation control device 30 stores, in the RAM, a correspondence relation U between combinations of angle positions of the motors M1 to M6 and positions of the TCP in the robot coordinate system RC (see a middle right side part in FIG. 2). The operation control device 30 stores, in the RAM, the target position St and the target force fst in association with each other for each step of work performed by the robot 20. The target position St and the target force fst are set by teaching work explained below.

When acquiring a rotation angle Da of the motors M1 to M6, the operation control device 30 converts, based on the correspondence relation U, the rotation angle Da into the position S of the TCP in the robot coordinate system RC (see the middle right side part in FIG. 2). More specifically, the rotation angle Da is converted into a combination of the position DX, the position DY, the position DZ, the angle position RX, the angle position RY, and the angle position RZ.

The force detecting section 21 detects a force fs in an independent coordinate system (see an upper right part in FIG. 2). Relative positions and relative directions of the force detecting section 21 and the TCP are stored in the RAM 30b of the operation control device 30 as known data (not shown in FIG. 2). Therefore, the operation control device 30 can specify the force fs in the robot coordinate system RC based on the position S of the TCP and an output of the force detecting section 21.

The operation control device 30 performs gravity compensation on the force fs after being converted into the robot coordinate system RC (see a lower right part in FIG. 2). The "gravity compensation" is processing for removing a gravity component from the force fs. The force fs on which the gravity compensation is performed represents a force other than the gravity acting on the end effector E. The force other than the gravity acting on the end effector E is hereinafter referred to as "acting force" as well.

The operation control device 30 specifies a force-derived correction amount ΔS by substituting the target force fst and the acting force fs in an equation of motion of compliant motion control (see a middle left side part in FIG. 2). In this embodiment, impedance control is adopted as the compliant motion control. The "impedance control" is control for realizing imaginary mechanical impedance with the motors M1 to M6. Expression (1) shown below is an equation of motion of the impedance control.

$$m\Delta\ddot{S}(t)+d\Delta\dot{S}(t)+k\Delta S(t)=\Delta f_S(t) \quad (1)$$

In Expression (1), m represents a mass parameter. The mass parameter is referred to as inertia parameter as well. In Expression (1), d represents a viscosity parameter and k represents an elasticity parameter. The parameters m, d, and k are obtained from the teaching device 50. The parameters m, d, and k may be set to different values for each direction or may be set to common values irrespective of a direction.

In Expression (1), Δfs(t) represents a deviation of the acting force fs with respect to the target force fst. In Expression (1), t represents time. In a process performed by the robot 20, the target force fst may be set as a fixed value or may be set according to a function that depends on time. Differential in Expression (1) means differential by time.

The force-derived correction amount ΔS obtained from Expression (1) means displacement in which the TCP should move in order to eliminate the force deviation Δfs(t) between the target force fst and the acting force fs and to achieve the target force fst when the TCP receives the acing force fs by mechanical impedance. The "displacement" is represented by a straight traveling distance and/or a rotation angle.

The operation control device 30 specifies a correction target position (St+ΔS) considering the impedance control by adding the force-derived correction amount ΔS to the target position St (see a middle right side part in FIG. 2).

The operation control device 30 converts, based on the correspondence relation U, the correction target position (St+ΔS) concerning respective six directions (the X-axis direction, the Y-axis direction, the Z-axis direction, the direction of the angle position RX, the direction of the angle position RY, and the direction of the angle position RZ) in the robot coordinate system RC into a target angle Dt, which is a target driving position of the respective motors M1 to M6 (see the middle right side part in FIG. 2).

The operation control device 30 executes feedback control for matching the rotation angle Da of the motors M1 to M6 indicated by outputs of the encoders E1 to E6 and the target angle Dt, which is a control target. More specifically, the operation control device 30 executes PID control concerning positions using a deviation De between the rotation angle Da and the target angle Dt and integral of the deviation De, and differential of the deviation De. In FIG. 2, a proportional gain Kpp, an integral gain Kpi, and a differential gain Kpd are shown (see a center part in FIG. 2).

The operation control device 30 executes the PID control concerning speed using an output of the PID control concerning positions executed using the Kpp, the Kpi, and the Kpd, a deviation from differential of the rotation angle Da, integral of the deviation, and differential of the deviation. In FIG. 2, a proportional gain Kvp, an integral gain Kvi, and a differential gain Kvd are shown (see a middle left side part in FIG. 2).

As a result of the processing explained above, a control amount Dc of the motors M1 to M6 is determined. The operation control device 30 controls the motors M1 to M6 with the control amount Dc of the motors M1 to M6.

According to the processing explained above, the operation control device 30 can control the arm A based on the target position St and the target force fst.

A3. Processing in the Teaching Device 50

(1) Determination of Realizability of Force Control: No. 1

Figure 3:
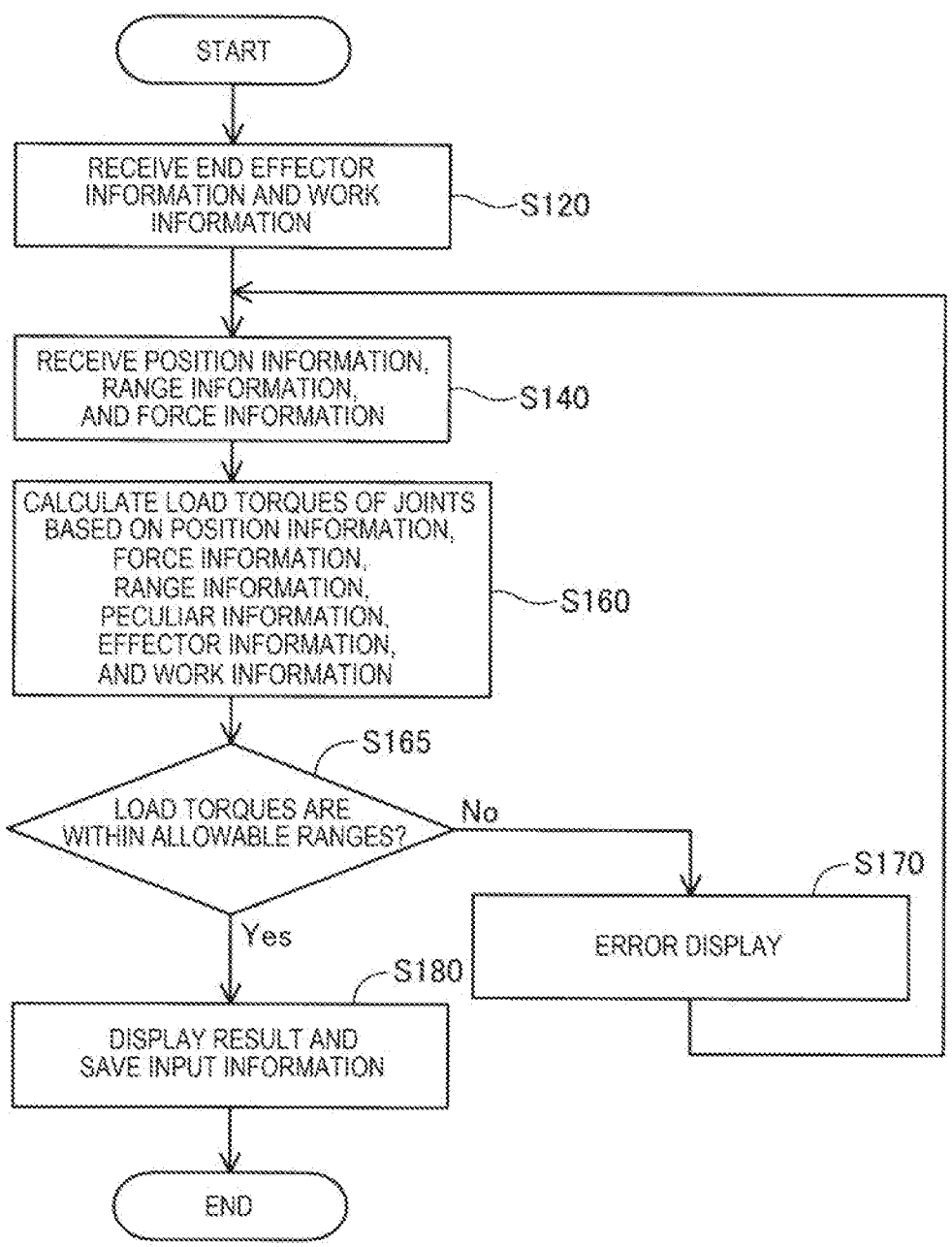
FIG. 3 is a flowchart showing processing in performing determination of realizability of force control from the viewpoint of load torque.

FIG. 3 is a flowchart showing processing in performing determination of realizability of force control from the viewpoint of load torque in the teaching device 50. Specifically, the CPU 50a (see FIG. 1) of the teaching device 50 executes the processing shown in FIG. 3.

In step S120, the teaching device 50 receives information concerning the end effector E and information concerning the work W from the user. The information concerning the end effector E includes (i) information concerning the weight of the end effector E and (ii) information concerning a relative positional relation between the position of the distal end of the arm A and the center of gravity position of the end effector E attached to the arm A. These kinds of information are referred to as "end effector information".

The information concerning the work W includes (i) information concerning the weight of the work W, (ii) information concerning a relative positional relation between the center of gravity position of the work W at the time when the work W is gripped by the end effector E in a target operation and the center of gravity position of the end effector E, and (iii) information concerning a relative positional relation between the position of a contact point of the end effector E and the work W at the time when the work W is gripped by the end effector E in the target operation and the center of gravity position of the end effector E. These kinds of information are referred to as "work information".

The end effector information and the work information are stored in the RAM 50b of the teaching device 50 in association with information for identifying the target operation. The end effector information in the RAM 50b is shown as "end effector information Ie" in FIG. 1. Work information in RAM 50b is shown as "work information Iw" in FIG. 1. A functional section of the teaching device 50 that receives the information concerning the end effector E and the information concerning the work W in step S120 is shown as a "receiving section 53" in FIG. 2.

In step S140 in FIG. 3, the teaching device 50 receives position information, range information, and force information from the user.

The teaching device 50 receives, from the user, "position information" representing a position of the TCP where and a posture of the end effector E in which the target operation should be started. "The position of the TCP where and the posture of the end effector E in which the target operation should be started" are, for example, a position and a posture of the TCP immediately before the arm A is controlled such that a force acts on the force detecting section 21 or a position and a posture immediately before another object is machined by the end effector E that grips a machining tool. The position information is specifically a combination of the position in the X-axis direction, the position in the Y-axis direction, the position in the Z-axis direction, the angle position RX of the rotation around the X axis, the angle position RY of the rotation around the Y axis, and the angle position RZ of the rotation around the Z axis in the robot coordinate system RC.

The teaching device 50 receives, from the user, "range information" representing a range of a position of the TCP and a posture of the end effector E that could fluctuate in the target operation. In the target operation in which the force control is performed, feedback control is performed using an output of the force detecting section. Therefore, the position of the TCP and the posture of the end effector E serving as control points are not limited to a position and a posture decided in advance. The position of the TCP and the posture of the end effector E in the target operation could change depending on an error of a shape and an error of disposition of the work W. Range information representing an assumed range of such a change is input to the teaching device 50 by the user. The range information is specifically a combination of a dimension (i.e., a range of a position) in the X-axis direction, a dimension in the Y-axis direction, a dimension in the Z-axis direction, an angle range of the rotation around the X-axis, an angle range of the rotation around the Y axis, and an angle range of the rotation around the Z axis in the robot coordinate system RC.

The teaching device 50 receives, from the user, "force information" representing the direction and the magnitude of the target force fst that should be applied to the work W when the target operation is executed. The force information is specifically specified by a combination of a force component in the X-axis direction, a force component in the Y-axis direction, a force component in the Z-axis direction, a torque component in the direction of the angle position RX, a torque component in the direction of the angle position RY, and a torque component in the direction of the angle position RZ in the robot coordinate system RC. However, the teaching device 50 is configured such that any one direction among the six directions is selectively input as the direction of the target force fst in step S120 in this embodiment. The teaching device 50 is configured such that any numerical value is input as the magnitude of the target force fst. The magnitude of the target force fst can take a positive value and a negative value.

The position information, the range information, and the force information input to the teaching device 50 are stored in the RAM 50b in association with information that can identify the target operation. The position information in the RAM 50b is shown as "position information Ip" in FIG. 1. The range information in the RAM 50b is shown as "range information Ir" in FIG. 1. The force information in the RAM 50b is shown as "force information If" in FIG. 1. A functional section of the teaching device 50 that receives and stores the position information, the range information, and the force information in step S140 is the receiving section 53 (see FIG. 2).

To facilitate understanding of the technique, the processing in step S120 and the processing in step S140 are divided and explained in the order of the steps (see FIG. 3). However, the information input to the teaching device 50 in steps S120 and S140 is not always input in the order of the steps. That is, a part or all of the kinds of information input in step S120 can also be input later than a part or all of the kinds of information input in step S140. However, information that can be input later than processing in step S170 explained below is a part or all of the kinds of information input in step S140.

Figure 4:
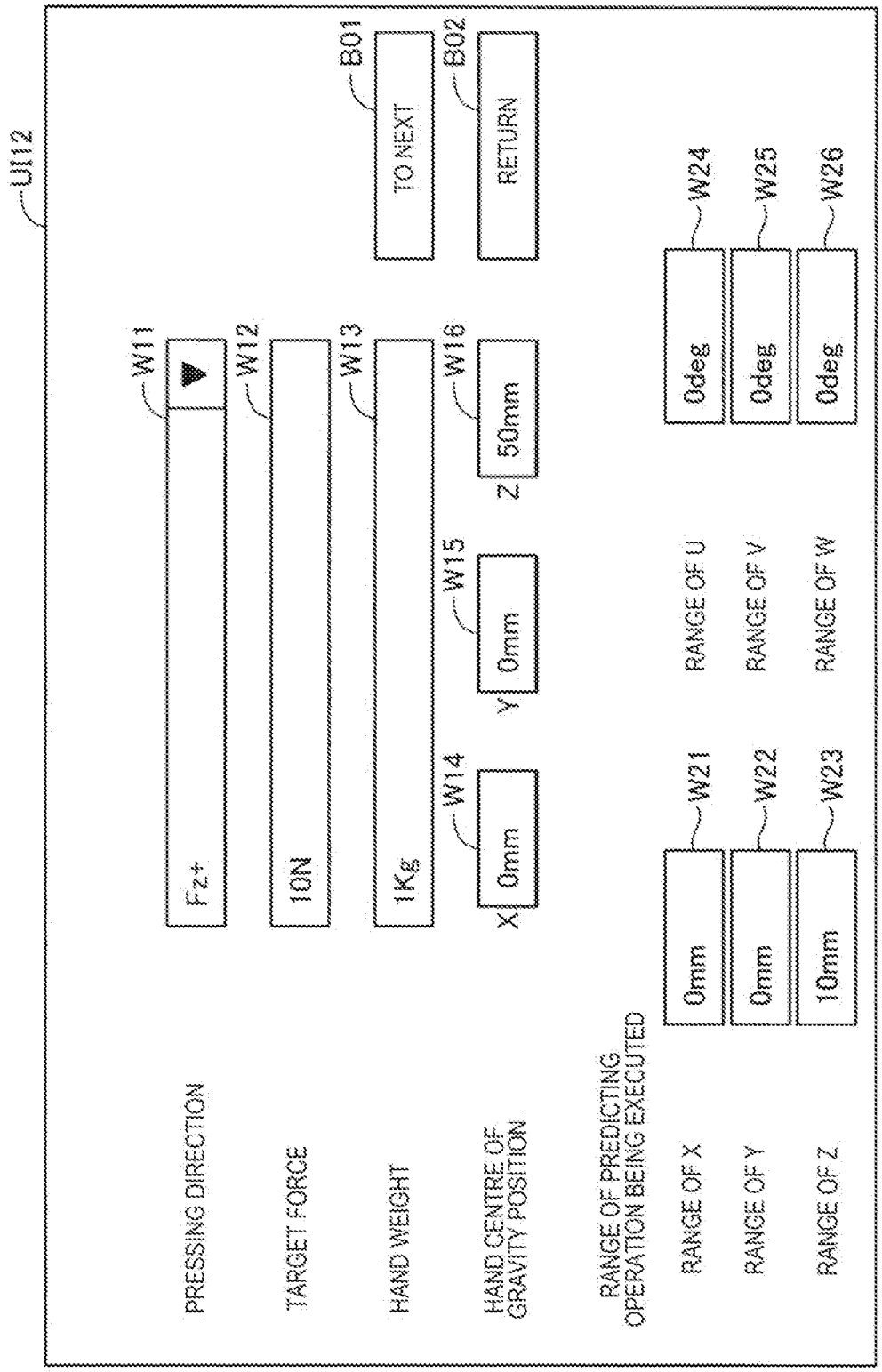
FIG. 4 shows a user interface displayed on an output device of the teaching device in steps S120 and S140 in FIG. 3.

FIG. 4 shows a user interface UI12 displayed on the output device 58 of the teaching device 50 in steps S120 and S140 in FIG. 3. It is assumed that the work information (see S120 in FIG. 3) and the position information (see S140 in FIG. 3) are input in advance prior to the display of the user interface UI12.

The user interface UI12 includes input windows W11 to W16, buttons B01 and B02, and input windows W21 to W26.

The input window W11 is an interface for inputting a direction of a target force in force control as a part of the force information (see S140 in FIG. 3). In an example shown in FIG. 4, a direction on a plus side of the Z-axis direction is designated. The input window W12 is an interface for inputting magnitude of a target force in the force control as a part of the force information (see S140 in FIG. 3). In the example shown in FIG. 4, 10 N is designated as the target force.

A form can be adopted in which the force information is stored in advance in the RAM 50b of the teaching device 50 in association with the information for identifying the target operation. In such a form, the user selects the target operation via a predetermined user interface. As a result, information is automatically input to the input windows W11 and W12 in the user interface UI12 shown in FIG. 4.

The input window W13 is an interface for inputting information concerning the weight of the end effector E as a part of the end effector information (see S120 in FIG. 3). In the example shown in FIG. 4, 1 kg is designated as the weight.

The input windows W14 to W16 are interfaces for inputting information concerning a relative positional relation between the position of the distal end of the arm A and the center of gravity position of the end effector E attached to the arm A as a part of the end effector information (see S120 in FIG. 3). In the example shown in FIG. 4, relative positions of 0 mm in the X-axis direction, 0 mm in the Y-axis direction, and 50 mm on the plus side in the Z-axis direction are designated as the information concerning the relative positional relation.

The input windows W21 to W23 are interfaces for inputting information concerning a range of the position of the TCP, which could fluctuate in the target operation, as a part of the range information (see S140 in FIG. 3). In the example shown in FIG. 4, position ranges of 0 mm in the X-axis direction, 0 mm in the Y-axis direction, and 10 mm in the Z-axis direction are designated as the information concerning the range of the position of the TCP.

The input windows W24 to W26 are interfaces for inputting information concerning a range of the posture of the end effector E, which could fluctuate in the target operation, as a part of the range information (see S140 in FIG. 3). In the example shown in FIG. 4, an angle range of 0 degrees in a U-axis direction (i.e., around the X axis), 0 degrees in a V-axis direction (i.e., around the Y axis), and 0 degrees in a W-axis direction (i.e., around the Z axis) are designated as the information concerning the range of the posture of the end effector E.

The button B01 is a button with which the user, who ends the input to the input windows W11 to W16 and the input windows W21 to W26, causes the teaching device 50 to perform the next processing. The button B02 is a button for returning to the processing before the input of the information via the user interface UI12. When the button B02 is pressed, the processing returns to a stage for inputting the work information (see S120 in FIG. 3) and the position information (see S140 in FIG. 3).

In step S160 in FIG. 3, the teaching device 50 acquires peculiar information Ic concerning a hardware configuration of the robot 20 from the RAM 30b of the operation control device 30 (see FIG. 1). The peculiar information Ic of the robot 20 is specifically (i) lengths among joints adjacent to one other (i.e., lengths of the links L1 to L5), (ii) weights of the links L1 to L5, (iii) rigidity of the joints J1 to J6, and (iv) allowable torques of the joints J1 to J6. "The rigidity of the joints" is a value indicating a degree of deviation of a rotation angle of a joint when a rotational force centering on the joint is received from the outside in a state in which the rotation angle of the joint is set to a certain value. "The allowable torque of the joint" is torque obtained by multiplying allowable torque of a motor of a joint by a coefficient (e.g., 0.8) equal to or smaller than 1 for providing a margin.

These values are values peculiar to the robot 20. These values are stored in advance in the RAM 30b of the operation control device 30. A functional section of the teaching device 50 that acquires the peculiar information Ic of the robot 20 in step S160 is shown as an "acquiring section 55" in FIG. 2.

The teaching device 50 calculates, concerning the joints J1 to J6, maximum values of load torques applied to the joints based on the end effector information and the work information (see S120), the position information, the range information, and the force information (see S140), and the peculiar information Ic. More specifically, concerning a plurality of representative positions (hereinafter referred to as "representative points" as well) included in an operation range specified by the position information and the range information, the teaching device calculates load torques applied to joints when force control designated by the force information is realized in a state in which the TCP is present in the plurality of representative positions. The teaching device 50 determines maximum values of the load torques concerning the joints J1 to J6 out of the obtained load torques corresponding to the plurality of representative positions.

Load torque applied to a certain joint can be calculated dividedly as load torque ta due to the gravity applied to a link present ahead of the joint, load torque tb due to the gravity applied to the end effector E and the work W, and load torque tc due to the target force in the force control.

The load torque tc due to the target force is calculated as explained below. A relative positional relation between a joint, for which load torque is calculated, and the TCP is calculated based on a posture of the arm, that is, positions and postures of the links L1 to L5 in the force control. A force obtained by projecting the target force applied to the TCP on a plane perpendicular to a rotation axis of the joint and having an origin in a rotation center of the joint (hereinafter referred to as "processing plane") is calculated. The load torque tc due to the target force applied to the joint is calculated based on the force and the distance between the TCP projected on the processing plane and the origin.

The load torque ta due to the gravity applied to the link present ahead of the joint is calculated as explained below. The following parameters are calculated based on the lengths of the links L1 to L5, the weights of the links L1 to L5, and the posture of the arm in the force control. That is, weight of the entire link present ahead of the joint and a relative positional relation between a center of gravity of a structure configured by the link present ahead of the joint and the joint are calculated. A force obtained by projecting, on the processing plane of the joint, the gravity of the entire link present ahead of the target joint applied to the center of gravity of the structure is calculated. The load torque to applied to the joint due to the gravity applied to the link present ahead of the joint is calculated based on the distance between the center of gravity of the structure projected on the processing plane and the origin.

The load torque tb due to the gravity applied to the work W and the end effector E is calculated as explained below. The following parameters are calculated based on the weight of the work W, the weight of the end effector E, information concerning a relative positional relation between the position of the distal end of the arm A and the center of gravity position of the end effector E attached to the arm A, information concerning a relative positional relation between the center of gravity position of the work W at the time when the work W is gripped by the end effector E in the target operation and the center of gravity position of the end effector E, the lengths of the links L1 to L5, and the posture of the arm in the force control. That is, a total value of the weight of the work W and the weight of the end effector E and a relative positional relation between the center of gravity of a structure configured by the work W and the end effector E and the joint are calculated. A force obtained by projecting, on a processing plane of the joint, the gravity of the structure configured by the work W and the end effector E applied to the center of gravity of the structure is calculated. The load torque tb applied to the joint due to the gravity applied to the work W and the end effector E is calculated based on the force and the distance between the center of gravity of the structure projected on the processing plane and the origin.

By using the end effector information and the work information, it is possible to more accurately calculate values of torques generated in the respective joint compared with when the end effector information and the work information are not used. By using, as a part of the work information, information concerning relative positions of the end effector and the target object at the time when the end effector grips the target object, it is possible to more accurately calculate values of torques generated in the respective joints compared when the information concerning the relative positions is not used.

By using ranges of a position and a posture in the force control as the range information, it is possible to calculate values of torques generated in the respective joints throughout the entire operation of the force control. Therefore, the user can more accurately learn whether the user can cause the robot to execute the force control specified by the size and the direction of the target force input to the robot control device, a start position, and a posture at a start time.

The load torque applied to the certain joint is a total of the load torque tc due to the target force obtained by the processing explained above, the load torque to due to the link present ahead of the joint, and the load torque tb due to the end effector E and the work W. A functional section of the teaching device 50 that realizes the processing in step S160 is shown as a "calculating section 56" in FIG. 2.

In step S165 of FIG. 3, the teaching device 50 determines whether maximum values of load torques applied to the joints J1 to J6 are within ranges of allowable torques of the joints J1 to J6. A rotating direction of a motor can take two directions of a normal rotation and a reverse rotation. Therefore, upper and lower limit values specifying a range of allowable torque of a joint can take both of a positive value and a negative value. In this embodiment, concerning the joints J1 to J6, upper limits of the ranges of the allowable torques are positive values and lower limits of the ranges of the allowable torques are negative values.

When a joint in which a maximum of load torque applied thereto is not within a range of allowable torque of the joint is present among the joints J1 to J6 in step S165, the processing proceeds to step S170.

In step S170, the teaching device 50 performs error display on the display functioning as the output device 58.

The teaching device 50 performs the following processing prior to the error display. Concerning a joint in which a maximum value of load torque exceeds a range of allowable torque of the joint, the teaching device 50 calculates margin torque tm obtained by subtracting, from an allowable torque threshold t01 on a close side to the load torque, the load torque to due to a link present ahead of the joint and the load torque tb due to the end effector E and the work W. When the arm A takes a posture designated by the force control according to so-called forward kinematics, the teaching device 50 calculates, based on the margin torque tm and a relative positional relation between the joint and the TCP and the direction of the target force in the force control, magnitude of a force that can be generated in the direction of the target force at the TCP. The teaching device 50 performs such processing concerning all joints, torques of which exceed the allowable torques of the joints. The teaching device 50 sets, as a possible force fp1, the magnitude of a minimum force among the magnitudes of the forces that can be generated in the direction of the target force at the TCP. The possible force fp1 is realizable magnitude of the target force in the force control specified by the direction of the target force and the position and the posture at the start time of the force control.

The teaching device 50 performs, concerning all the joints, the same processing as the processing explained above and calculates a possible force fp2 in the opposite direction using an allowable torque threshold t02 on a far side from the load torques.

Figure 5:
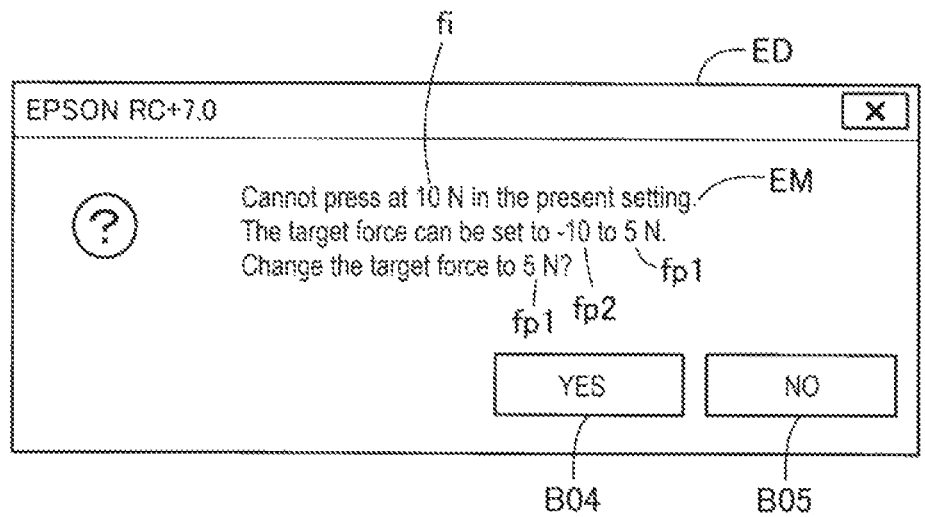
FIG. 5 is an error display output to a display functioning as an output device in step S170 in FIG. 3.

FIG. 5 is error display ED output to the display functioning as the output device 58 in step S170 in FIG. 3. In step S170 in FIG. 3, the teaching device 50 performs the error display ED output to the display functioning as the output device 58 using the magnitude of the target force and the possible forces fp1 and fp2. In an example shown in FIG. 5, an error message EM "Cannot press at 10 N in the present setting. The target force can be set to −10 to 5 N. Change the target force to 5 N?" is displayed. The error message EM represents information indicating that force control specified by magnitude and a direction of an input target force and a start position and a posture of input force control is unrealizable.

"10 N" in the error message EM is magnitude fi of the input target force (see W12 in FIG. 4). "5 N" is the possible force fp1 in the same direction as the direction of the target force. "−10 (N)" is the possible force fp2 in the opposite direction of the direction of the target force.

When the error message EM is output according to such processing, the user can learn that the user cannot cause the robot to execute force control specified by magnitude and a direction of a target force input to the robot control device, a start position, and a posture at a start time.

Since the realizable magnitude fp1 of the target force is output, the user can learn magnitude of a force that the user can cause the robot to realize in force control specified by a direction of a target force input to the robot control device, a start position, and a posture at a start time.

The error display ED includes buttons B04 and B05. The user views the error display ED and presses one of the button B04 of "YES" and the button B04 of "NO". Thereafter, the processing returns to step S140 in FIG. 3.

When the button B04 of "YES" is pressed in step S170, in the input window W12 of the user interface UI12 shown in FIG. 4 displayed again in step S140, the possible force fp1, that is, "5 N" is automatically input instead of the value "10 N" input in the last processing in step S140.

When the button B05 of "NO" is pressed in step S170, the value "10 N" input in the last processing in step S140 is directly input to the input window W12 of the user interface UI12 shown in FIG. 4 displayed in step S140. The user inputs another value to the input window W12 referring to the error message EM shown in FIG. 5 or changes setting of another input window of the user interface UI12.

When, in step S165, concerning all the joints J1 to J6 in FIG. 3, the maximum values of the load torques applied to the joints are within the ranges of the allowable torques of the joints, the processing proceeds to step S180.

In step S180, the teaching device 50 performs, concerning all the joints, display of an examination result on the display functioning as the output device 58 using the allowable torque threshold t01 on the close side to the load torques and the load torques.

Figure 6:
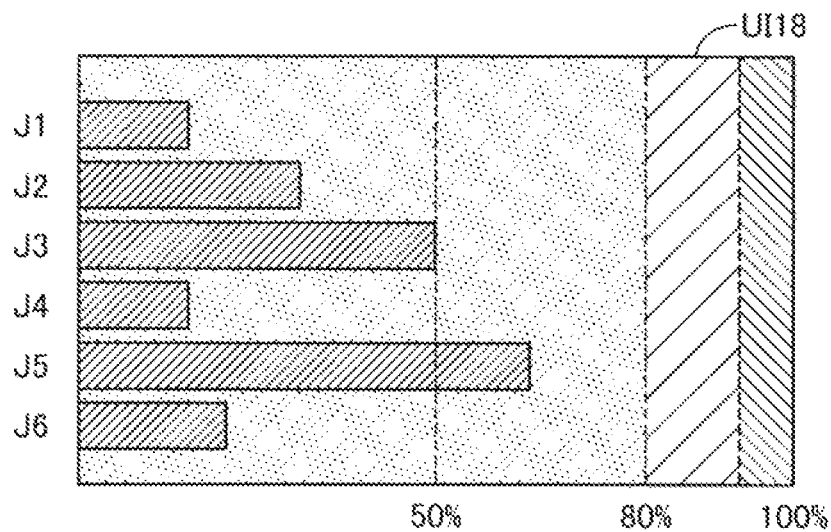
FIG. 6 is a diagram showing a user interface displayed on the display functioning as the output device in step S180 in FIG. 3.

FIG. 6 is a diagram showing the user interface UI18 displayed on the display functioning as the output device 58 in step S180 shown in FIG. 3. The teaching device 50 shows, concerning all the joints J1 to J6, ratios of the load torques to the allowable torque threshold t01. 100% indicates that the load torques are equal to the allowable torque threshold t01. In an example shown in FIG. 6, regions where the ratios of the load torques to the allowable torque threshold t01 are equal to or lower than 80% are indicated by green, regions where the ratios exceed 80% are indicated by yellow, and regions where the ratios exceed 92% are indicated by red. According to such processing, the user can learn which degrees of reserve power the motors of the robot 20 have with respect to the force control designated in steps S120 and S140 in FIG. 3.

In step S180 in FIG. 3, the teaching device 50 stores the information input in steps S120 and S140 in the RAM 50$b$ in association with the information for identifying the target operation. Further, the teaching device 50 outputs the information input in steps S120 and S140 to the operation control device 30 together with the information for identifying the target operation. The operation control device 30 stores both the kinds of information in the RAM 30$b$ in association with each other.

The information stored in the RAM 50$b$ and the RAM 30$b$ in step S180 is shown as "operation setting value SMV of force control" in FIG. 1. A functional section of the teaching device 50 that performs the display on the output device 58 in the processing in steps S165, S170, and S180 in FIG. 3 is shown as an "output control section 52" in FIG. 2. A functional section of the teaching device 50 that stores the information input in steps S120 and S140 in the RAM 50$b$ and outputs the information to the operation control device 30 in the processing in step S180 in FIG. 3 is shown as a "setting section 54" in FIG. 2.

According to this embodiment, in causing the robot to perform the force control, the user can learn, according to whether the user interface UI18 (see FIG. 6) is output or the error display ED (see FIG. 5) is output, whether the user can cause the robot to execute force control specified by magnitude and a direction of a target force input to the robot control device 25, a start position, and a posture at a start time.

In this embodiment, the RAM 30$b$ of the operation control device 30 that stores the peculiar information Ic is referred to as "storing section" as well. Information represented by the user interface UI18 (see FIG. 6) is referred to as "information of a first type" as well. Information represented by the error message EM (see FIG. 5) is referred to as "information of a second type" as well. The end effector information Ie and the work information Iw are collectively referred to as "selection information" as well.

2 Determination of Realizability of Force Control: No. 2

Figure 7:
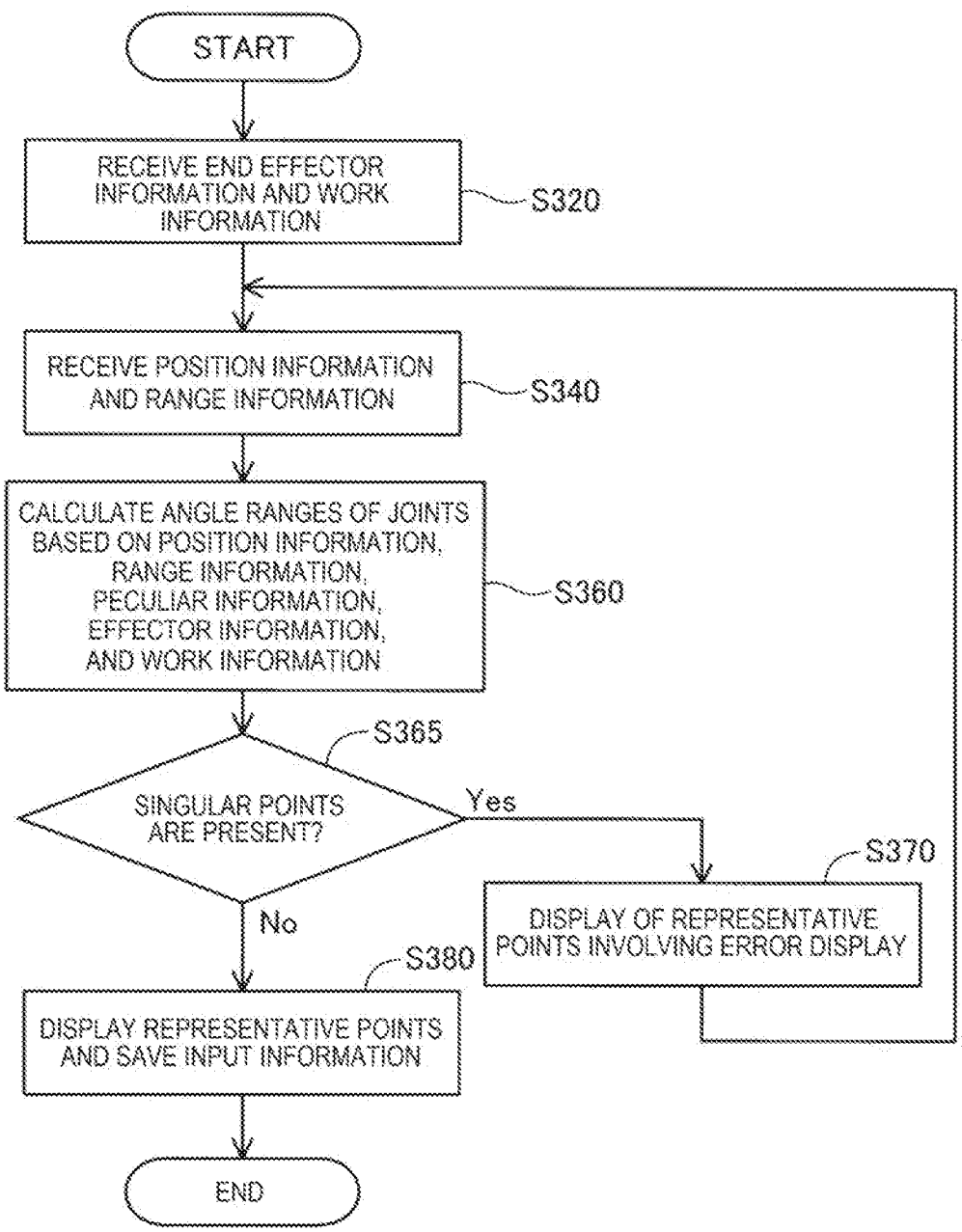
FIG. 7 is a flowchart showing processing in performing determination of realizability of the force control from the viewpoint of a singular point of a posture of an arm in the teaching device.

FIG. 7 is a flowchart showing processing in performing determination of realizability of the force control from the viewpoint of presence or absence of a singular point of a posture of the arm A in the teaching device 50. Specifically, the CPU 50a (see FIG. 1) of the teaching device 50 executes the processing shown in FIG. 7.

In step S320, the teaching device 50 receives information concerning the end effector E and information concerning the work W from the user. The processing in step S320 is the same as the processing in step S120 in FIG. 3.

In step S340, the teaching device 50 receives position information and range information from the user. The processing in step S340 is the same as the processing in step S140 in FIG. 3 except that the teaching device 50 does not receive force information.

In step S360, the teaching device 50 acquires the peculiar information Ic concerning a hardware configuration of the robot 20 from the RAM 30b (see FIG. 1) of the operation control device 30. The teaching device 50 calculates, based on the end effector information and the work information (see S320), the position information and the range information (see S340), and the peculiar information Ic, angle positions of the joints J1 to J6 at the time when the TCP serving as the control point takes a plurality of representative positions (hereinafter referred to as "representative points") included in an operation range specified by the position information and the range information. The teaching device 50 can perform this calculation according to so-called inverse kinematics. The teaching device 50 determines, based on the obtained angle positions of the joints corresponding to the plurality of representative points, angle ranges that can be taken concerning the joints J1 to J6.

In step S365, the teaching device 50 determines whether singular points are present among the plurality of representative points included in the operation range specified by the position information and the range information. The "singular point" is a position where the TCP serving as the control point cannot be controlled and is a position where angle ranges of the joints cannot be determined in the processing in step S360.

When singular points are present among the representative points in step S365, the processing proceeds to step S370. In step S370, the teaching device 50 displays the representative points on the display 58 functioning as the output device 58 together with an error message.

Figure 8:
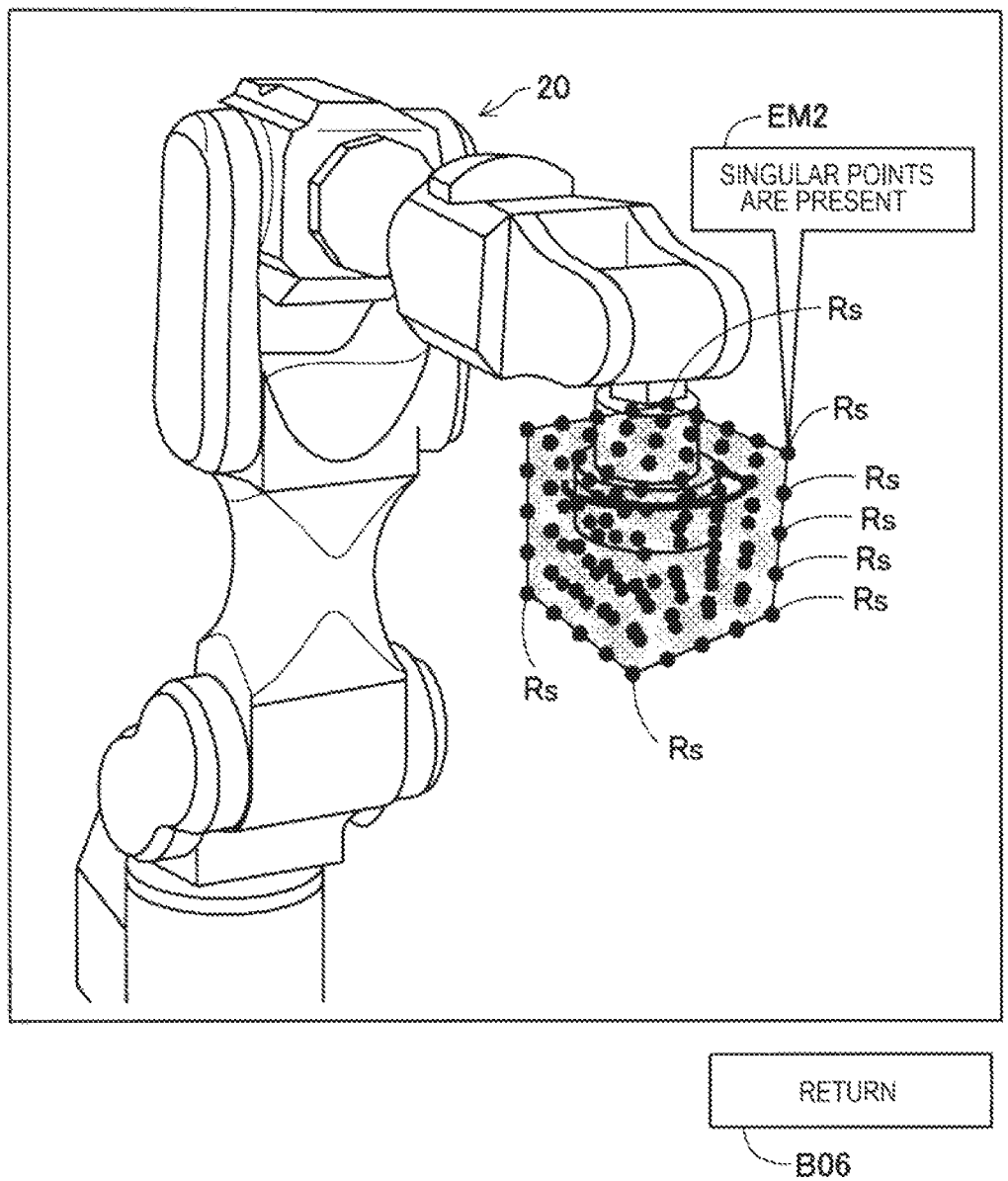
FIG. 8 is a diagram showing display of the output device in step S370 in FIG. 7.

FIG. 8 is a diagram showing the display of the output device 58 in step S370 in FIG. 7. The teaching device 50 displays representative points Rs in a three-dimensional space on the display functioning as the output device 58 together with a three-dimensional image of the robot 20. The representative points Rs, which are not singular points, are displayed as green points. The representative points Rs, which are singular points, are displayed as red points. When the representative points Rs, which are the singular points, are present, an error message EM2 "singular points are present" is displayed in association with one of the representative points Rs, which are the singular points.

When the button B06 being displayed shown in FIG. 8 is pressed, the processing returns to step S340. In step S340, the user changes setting of one or both of the position information and the range information.

When singular points are absent among the representative points Rs in step S365 in FIG. 7, the processing proceeds to step S380. In step S380, the teaching device 50 displays the representative points Rs on the display 58 functioning as the output device 58. The display in step S380 is the same as the display in FIG. 8 except that red points representing the representative points Rs, which are the singular points, and the error message EM2 "singular points are present" are not displayed.

The teaching device 50 stores the information input in steps S320 and S340 in the RAM 50b in association with the information for identifying the target operation. Further, the teaching device 50 outputs the information input in steps S320 and S340 to the operation control device 30 together with the information for identifying the target operation. The operation control device 30 stores both the kinds of information in the RAM 30b in association with each other.

The processing for determining realizability of the force control from the viewpoint of presence or absence of singular points of a posture of the arm A shown in FIG. 7 can be performed prior to the processing shown in FIG. 3 or can be performed in parallel to the processing shown in FIG. 3. When the processing shown in FIG. 3 and the processing shown in FIG. 7 are performed in parallel, the processing in steps S320 and S340 in FIG. 7 can be omitted.

According to this embodiment, in causing the robot to perform the force control, the user can learn, according to whether the error message EM2 (see FIG. 8) is output, from the viewpoint of presence or absence of singular points, whether the user can cause the robot to execute force control specified by a start position input to the robot control device 25, a posture at a start time, and an operation range.

3 Retrieval of a Position where the Force Control is Realizable

Figure 9:
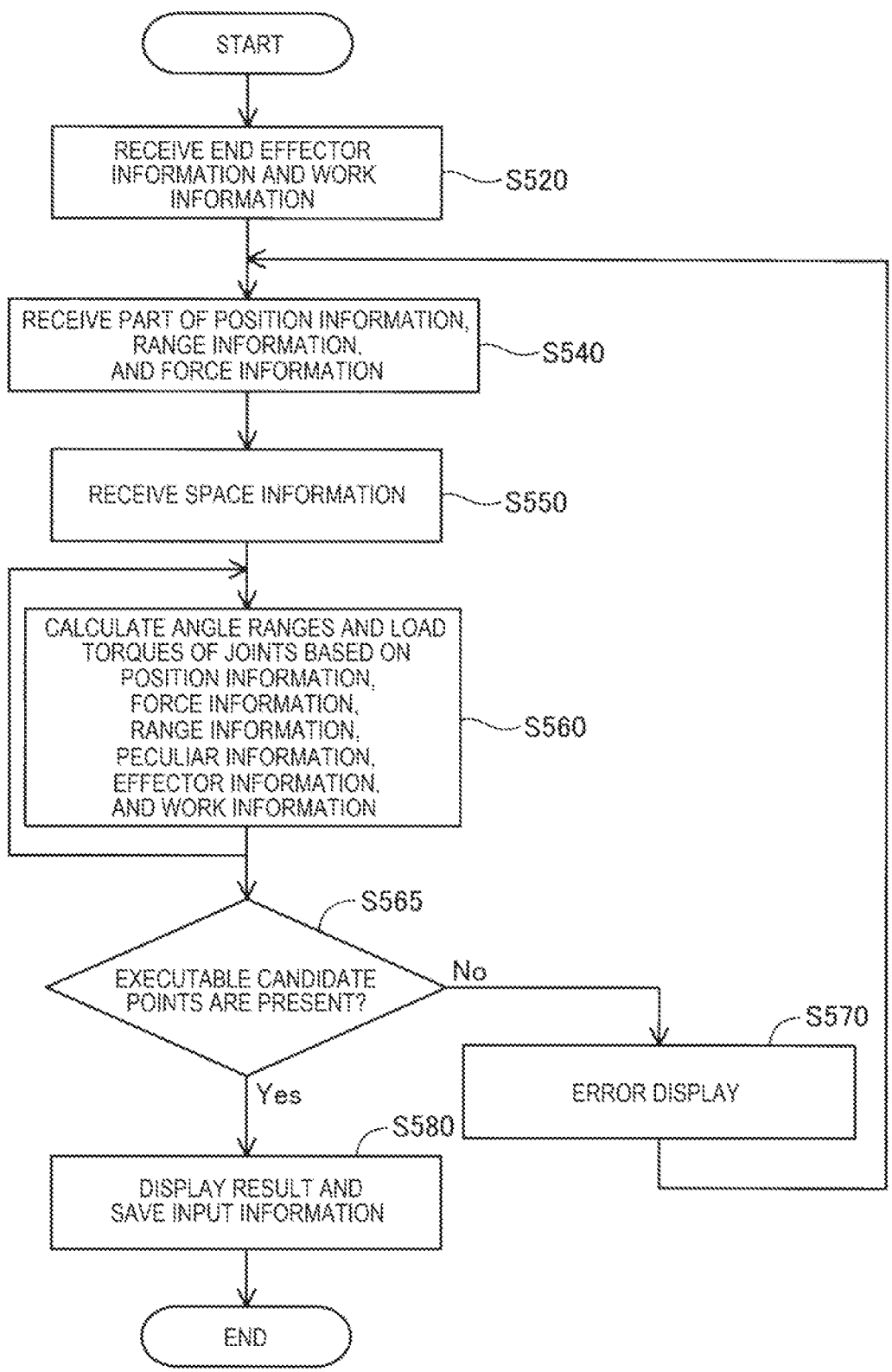
FIG. 9 is a flowchart showing processing in determining a candidate position where the force control is realizable.

FIG. 9 is a flowchart showing processing in determining a candidate position where realization of the force control is possible. Specifically, the CPU 50a (see FIG. 1) of the teaching device 50 executes the processing shown in FIG. 9.

In step S520, the teaching device 50 receives information concerning the end effector E and information concerning the work W from the user. The processing in step S520 is the same as the processing in step S120 in FIG. 3.

In step S540, the teaching device 50 receives, from the user, posture information, which is a part of position information, representing a posture of the end effector E, range information, and force information. The processing in step S540 is the same as the processing in step S140 in FIG. 3 except that the teaching device 50 does not receive position information of a control point in the position information.

In step S550, the teaching device 50 receives space information from the user. The "space information" is information designating a space in which a position where force control designated by the user can be realized should be searched.

Figure 10:
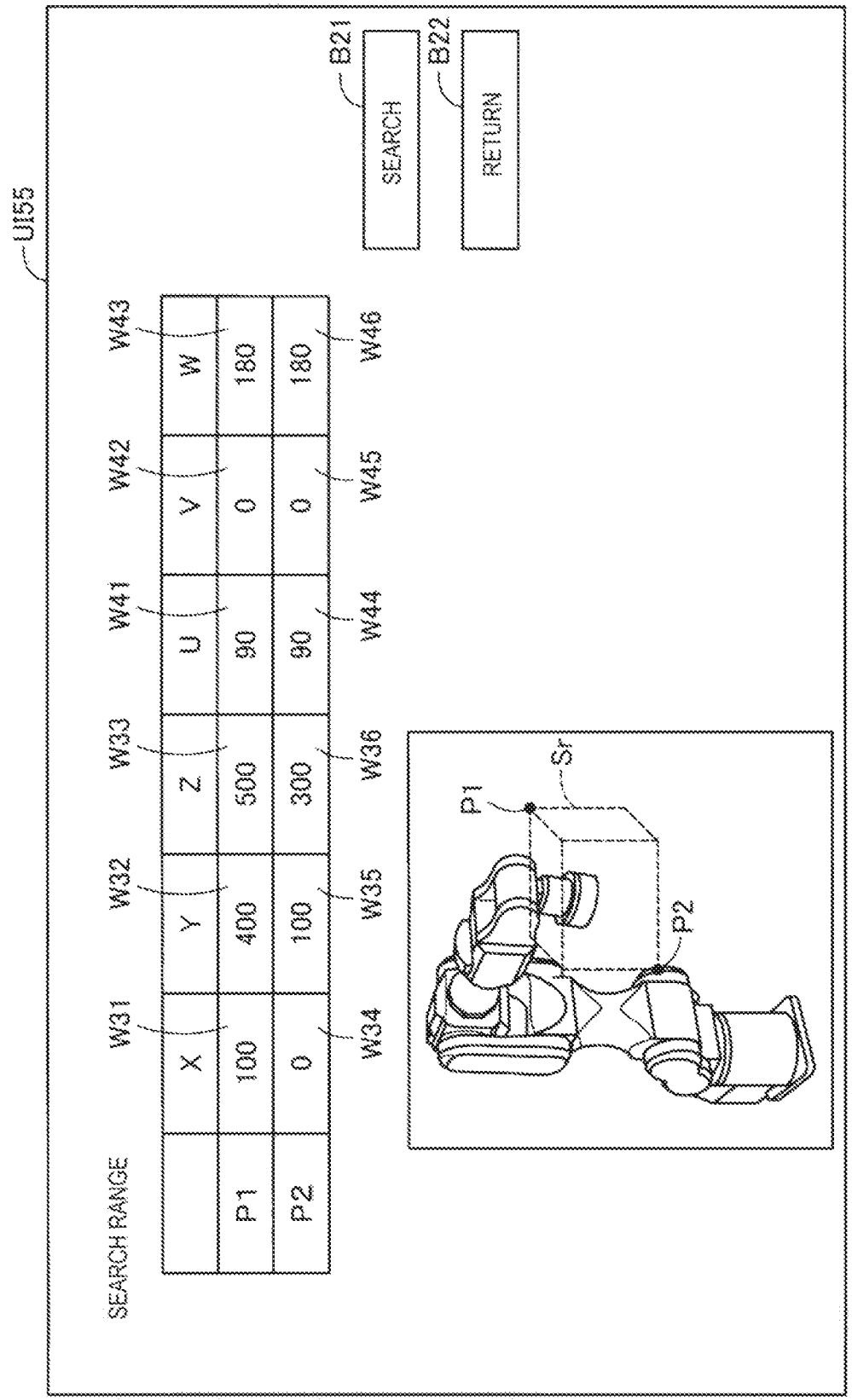
FIG. 10 is a diagram showing a user interface displayed on the output device of the teaching device in step S550 in FIG. 9.

FIG. 10 shows a user interface UI55 displayed on the output device 58 of the teaching device 50 in step S550 in FIG. 9. The user interface UI55 includes input windows W31 to W36 and W41 to W46 and buttons B21 and B22.

The input windows W31 to W33 are interfaces for designating a first vertex P1 for designating, as a rectangular parallelepiped, the space in which the position where the force control can be realized should be searched. In an example shown in FIG. 10, a point of (X, Y, Z)=(100, 400, 500) in the robot coordinate system RC is designated as the vertex P1.

The input windows W31 to W36 are interfaces for designating a second vertex P2 for designating, as a rectangular parallelepiped, a space in which a position where force control can be realized should be searched. In an example shown in FIG. 10, a point of (X, Y, Z)=(0, 100, 300) in the robot coordinate system RC is designated as the vertex P2.

A space Sr in which a position where the force control can be realized should be searched is a space having the vertexes P1 and P2 as vertexes and defined by two surfaces parallel to an XY plane, two surfaces parallel to a YZ plane, and two surfaces parallel to a ZX plane.

The input windows W41 to W43 are interfaces for designating a posture at the vertex P1. In the example shown in FIG. 10, a posture of (U, V, W)=(90, 0, 180) in the robot coordinate system RC is designated.

The input windows W44 to W46 are interfaces for designating a posture at the vertex P2. In the example shown in FIG. 10, a posture of (U, V, W)=(90, 0, 180) in the robot coordinate system RC is designated. In this embodiment, the teaching device 50 reflects a combination of values input to one of the input windows W44 to W46 and the input windows W41 to W43 on the other.

By performing such processing, compared with when the designation of the space Sr in which a position where the force control can be realized should be searched is not received, the teaching device 50 can determine, with a smaller processing load, a position where a value of torque generated in a joint is equal to or smaller than a value of allowable torque.

The button B21 is a button with which the user, who ends the input to the input windows W31 to W36 and W41 to W46, causes the teaching device 50 to perform the next processing. The button B22 is a button for returning to the processing before the input of information via the user interface UI55. When the button B22 is pressed, the processing returns to a stage before step S540 in FIG. 9. The receiving section 53 functioning as a functional section of the teaching device 50 executes the processing in step S550.

In step S560 in FIG. 9, the teaching device 50 determines a plurality of candidate points in the space Sr specified by the space information. In this embodiment, the teaching device 50 sets, as the candidate points, intersections of points that equally divide sides of the space Sr of a rectangular parallelepiped specified by the space information into four and a surface parallel to the XY plane, a surface parallel to the YZ plane, and a surface parallel to the ZX plane passing those points. The teaching device 50 performs the following processing concerning the candidate points.

In step S560 in FIG. 9, the teaching device 50 calculates, based on the end effector information and the work information (see S520), information representing positions of the candidate points (hereinafter referred to as "candidate point information"), the posture information, the range information, and the force information in the position information (see S540), and the peculiar information Ic, maximum values of load torques applied to joints concerning a plurality of representative points included in an operation range specified by the candidate point information and the range information. This processing is the same as the processing in step S160 in FIG. 3.

The teaching device 50 determines, based on the end effector information and the work information (see S320), the candidate point information and the range information (see S140), and the peculiar information Ic, angle ranges taken by the joints concerning the plurality of representative points. This processing is the same as the processing in step S360 in FIG. 7.

When the teaching device 50 ends the processing explained above concerning all the candidate points included in the space Sr of the rectangular parallelepiped specified by the space information, the processing proceeds to step S565. The calculating section 56 functioning as a functional section of the teaching device 50 executes processing in step S560.

In step S565, the teaching device 50 determines, concerning the candidate points, whether maximum values of load torques applied to the joints J1 to J6 are within the ranges of the allowable torques of the joints J1 to J6. The determination processing performed concerning the candidate points is the same as the determination processing in step S165 in FIG. 3.

The teaching device 50 determines whether singular points are present among the plurality of representative points included in the operation range specified by the candidate point information and the range information. The determination processing performed concerning the candidate points is the same as the determination processing in step S365 in FIG. 7.

After the respective kinds of processing explained above, the teaching device 50 determines, concerning all the joints J1 to J6, whether the maximum values of the load torques are within the ranges of the allowable torques and candidate points where singular points are absent (hereinafter referred to as "executable candidate points") are present.

When the executable candidate points are absent in step S565, the processing proceeds to step S570. In step S570, the teaching device 50 outputs error display to the display functioning as the output device 58. The error display can be, for example, display such as "a point where work is executable is absent in the designated range". When a predetermined button is pressed, the processing returns to step S540. The user changes setting of one or both of the position information and the range information in step S540 or changes setting of the space information in step S550.

When the executable candidate points are present in step S565, the processing proceeds to step S580. In step S580, the teaching device 50 displays the candidate points on the display functioning as the output device 58.

Figure 11:
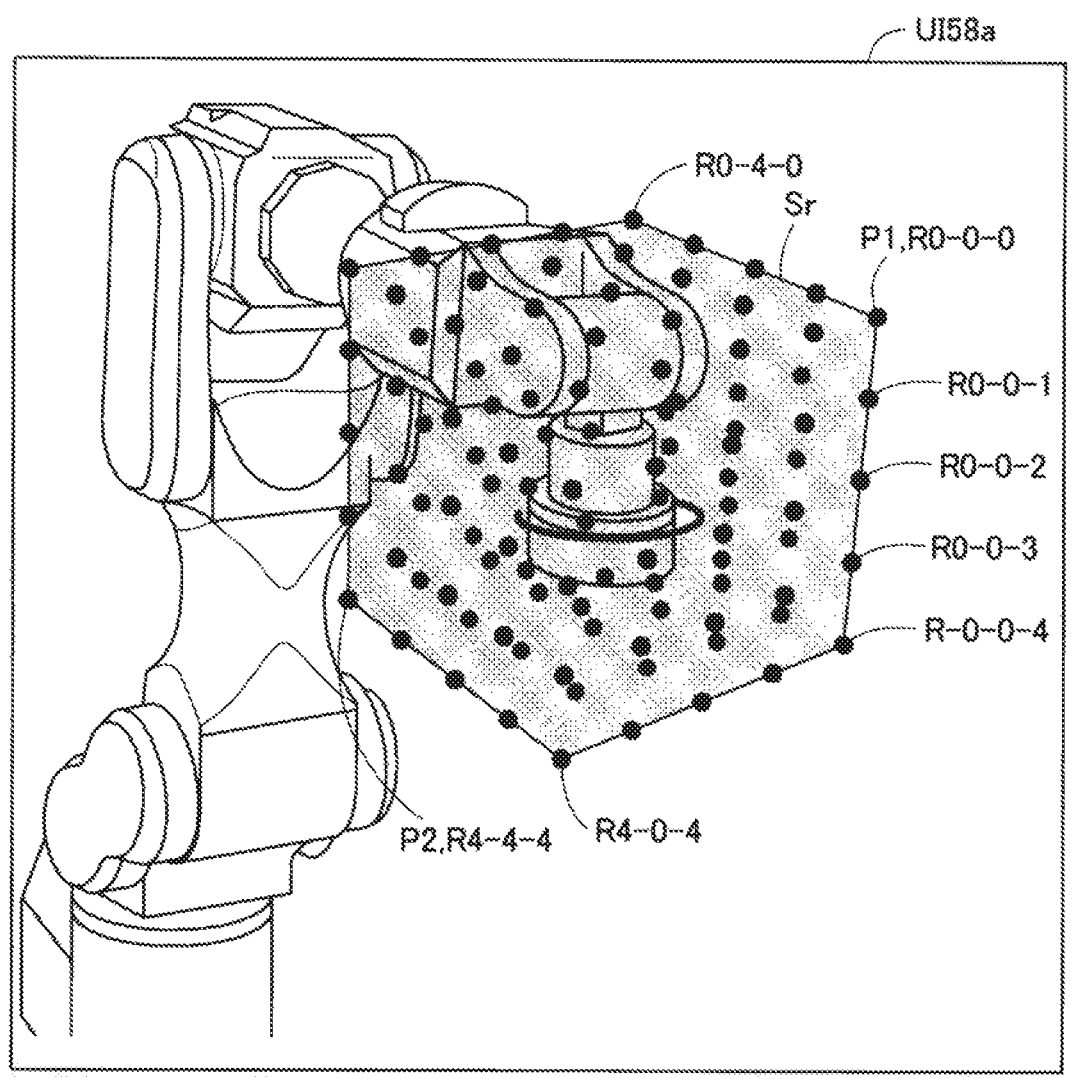
FIG. 11 is a diagram showing a user interface displayed on the output device in step S580 in FIG. 9.

FIG. 11 is a diagram showing a user interface UI58a displayed on the output device 58 in step S580 in FIG. 9. In step S580, the teaching device 50 displays the user interface UI58a on the display functioning as the output device 58. The user interface UI58a includes a three-dimensional image of the robot 20 and display of one hundred twenty-five candidate points R0-0-0 to R4-4-4 in a three-dimensional space. The executable candidate points are displayed as green points. The candidate points, which are not the executable candidate points, are displayed as red points.

To facilitate understanding of the technique, although not shown in FIG. 11, in the output in step S580, a three-dimensional convex hull including a set of the executable candidate points is displayed in pale green. A "convex hull" of a set of certain points is an intersection, that is, a common portion of all convex sets including the set of the points.

Figure 12:
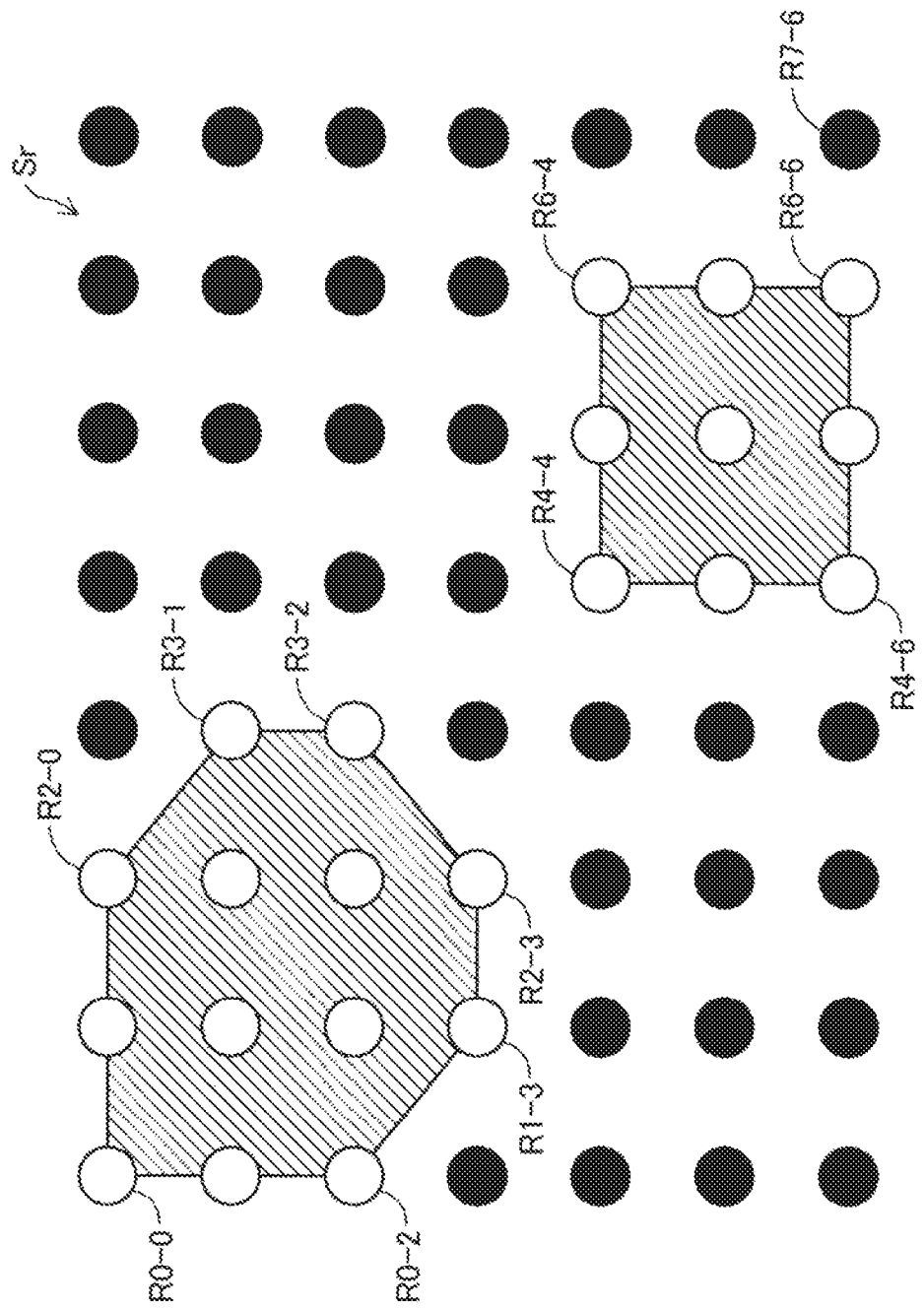
FIG. 12 is an explanatory diagram showing an example of convex hulls formed when it is assumed that candidate points are fifty-six points of two-dimensional points R0-0 to R7-6.

FIG. 12 is an explanatory diagram showing an example of a convex hull formed when it is assumed that candidate points are fifty-six points of two-dimensional points R0-0 to R7-6. Executable candidate points are indicated by white circles. Candidate points other than the executable candidate points are indicated by black circles. Regions indicated by hatching are convex hulls of the executable candidate points. As shown in FIG. 12, one or more convex hulls are present in the space Sr in which a position where the force control can be realized should be searched.

Figure 13:
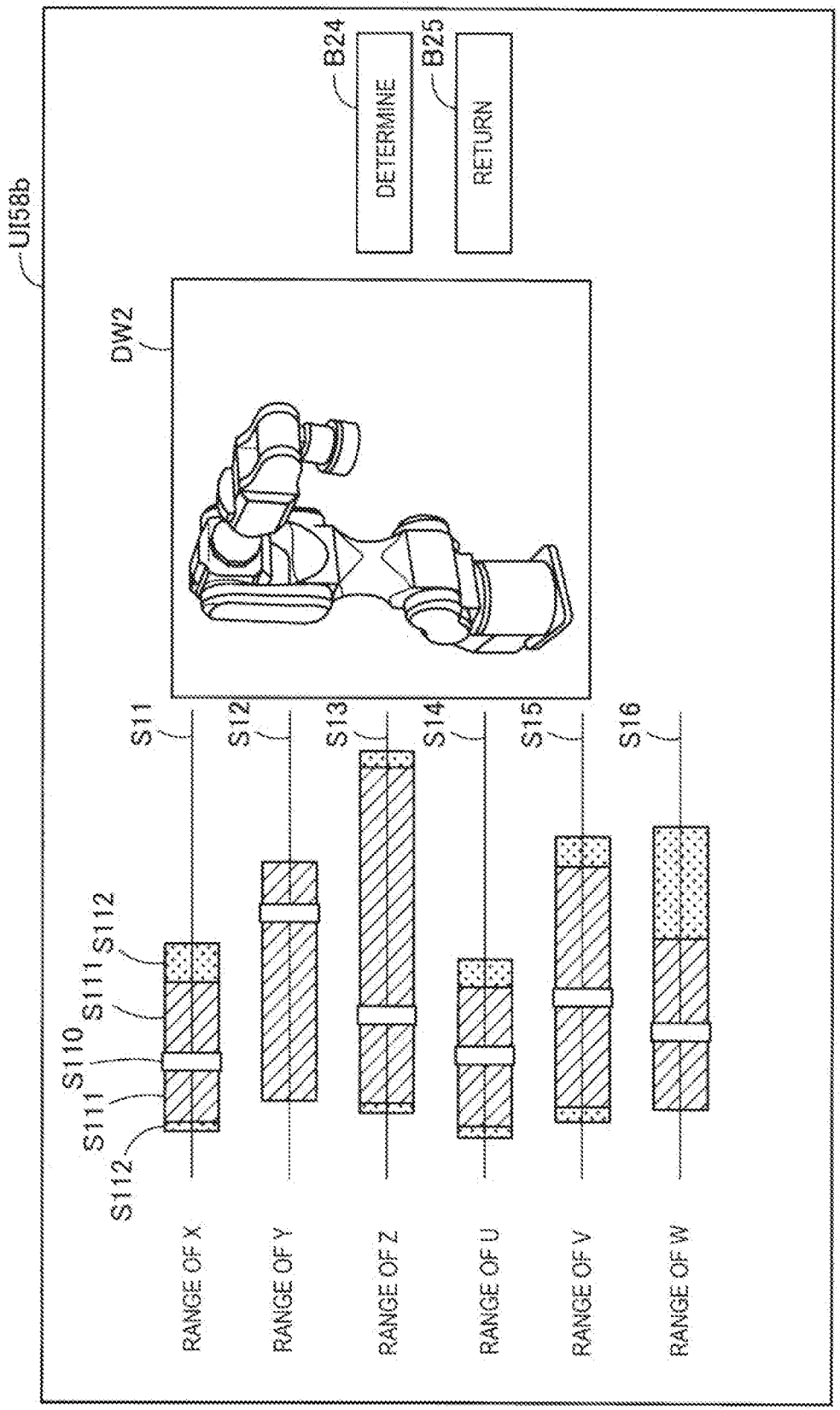
FIG. 13 is a diagram showing a user interface representing ranges considered to be taken in axial directions.

FIG. 13 is a diagram showing a user interface UI58b representing ranges considered to be taken in axial directions. In a state shown in FIG. 11, when one of the executable candidate points or the space Sr is clicked via the mouse functioning as the input device 57, the teaching device 50 displays the user interface UI58b shown in FIG. 13 on the display functioning as the output device 58. The user interface UI58b includes slider displays S11 to S16, an image display DW2, and buttons B24 and B25.

The image display DW2 shows a perspective view representing a state of the robot 20 at the time when the robot 20 takes a posture of the clicked executable candidate point.

The slider display S11 represents a search range S112 in the X-axis direction, an executable range S111, and a slider S110 indicating the position of a TCP of a robot displayed in the image display DW2. More specifically, a search range in the X-axis direction is indicated by a red rectangle S112. In FIG. 13, for convenience, the search range S112 in the X-axis direction is indicated by a dotted region. In the search range S112 in the X-axis direction, an executable range is indicated by a blue rectangle S111. In FIG. 13, for convenience, the executable range S111 in the X-axis direction is indicated by a hatched region. In the executable range S111 in the X-axis direction, the slider S110 indicating the position of the robot displayed in the image display DW2 is indicated by a white rectangle.

Similarly, the slider displays S12 and S13 respectively represent search ranges in the Y-axis direction and the Z-axis direction, executable ranges, and sliders indicating the position of the TCP of the robot displayed in the image display DW2. The slider displays S14 to S16 respectively represent search ranges in the U-axis direction, the V-axis direction, and the W-axis direction, executable ranges, and sliders indicating a posture of a finger of the robot displayed in the image display DW2.

According to such processing, the user can learn which degrees of margins positions and postures of candidate points have with respect to the executable ranges. FIG. 13 is a diagram for explaining technical content. In FIG. 13, a posture of the robot 20 displayed in the image display DW2 and numerical values shown in the slider displays S11 to S16 do not always match.

The display of the executable ranges of the slider displays S11 to S16 in the user interface UI58b shown in FIG. 13 is equivalent to the convex hull of the executable candidate points in the user interface UI58a.

The button B25 is a button for returning to the processing of the selection of the executable candidate points via the user interface UI58a. When the button B25 is pressed, the processing returns to the processing of the selection of the executable candidate points via the user interface UI58a.

The button B24 is a button for deciding the executable candidate points. When the button B24 is pressed, the teaching device 50 stores the information input in steps S520 and S540 and candidate point information of the selected executable candidate points in the RAM 50b in association with the information for identifying the target operation. Further, the teaching device 50 outputs the information input in steps S520 and S540 and the candidate point information of the selected executable candidate points to the operation control device 30 together with the information for identifying the target operation. The operation control device 30 stores both the kinds of information in the RAM 30b in association with each other. The operation control device 30 can control the robot 20 later based on stored those kinds of information.

In the processing in steps S565, S570, and S580 in FIG. 9, a functional section of the teaching device 50 that performs the display on the output device 58 is the output control section 52 (see FIG. 2). In the processing in step S580 in FIG. 3, a functional section of the teaching device 50 that stores the information input in steps S520 and S540 and the candidate point information of the selected executable candidate points in the RAM 50b, and outputs both the kinds of information to the operation control device 30 is the setting section 54 (see FIG. 2).

According to this embodiment, in causing the robot 20 to perform the force control, the user can learn, in advance, via the user interface UI58a (see FIG. 11), a point where the force control specified by the magnitude and the direction of the target force can be executed. The user can save, via the user interface UI58b, one of the executable candidate points in the operation control device 30 as a setting value of the force control that the user causes the robot 20 to execute.

B. Second Embodiment

Figure 14:
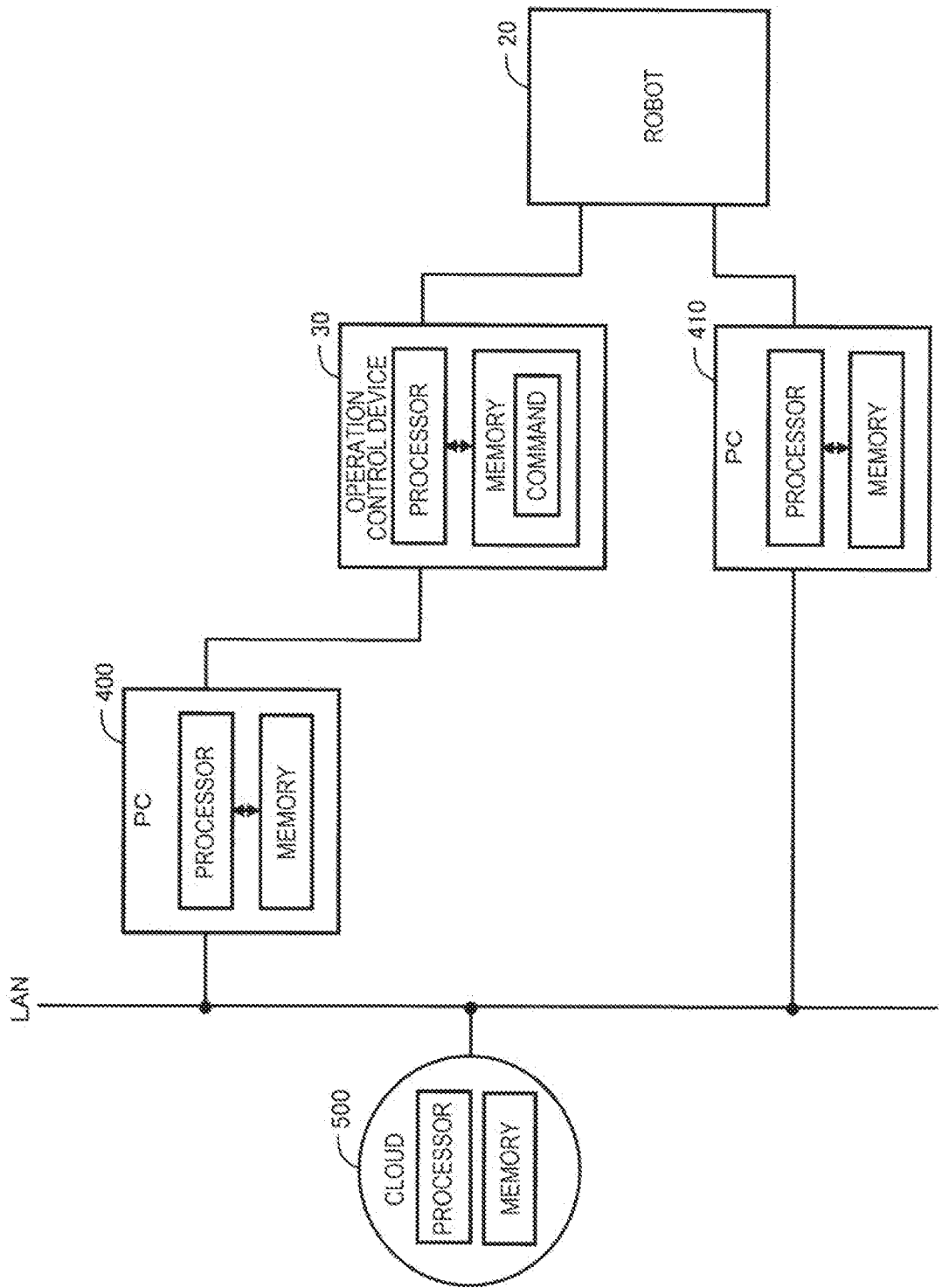
FIG. 14 is a conceptual diagram showing an example in which a control device of a robot is configured by a plurality of processors.

FIG. 14 is a conceptual diagram showing an example in which a control device of a robot is configured by a plurality of processors. In this example, besides the robot 20 and the operation control device 30 of the robot 20, personal computers 400 and 410 and a cloud service 500 provided via a network environment such as a LAN are drawn. The personal computers 400 and 410 respectively include processors and memories. A processor and a memory are usable in the cloud service 500 as well. The processors execute computer-executable commands. It is possible to realize, using a part or all of the plurality of processors, the robot control device 25 including the operation control device 30 and the teaching device 50. It is also possible to realize, using a part or all of the plurality of memories, a storing section that stores various kinds of information.

C. Third Embodiment

Figure 15:
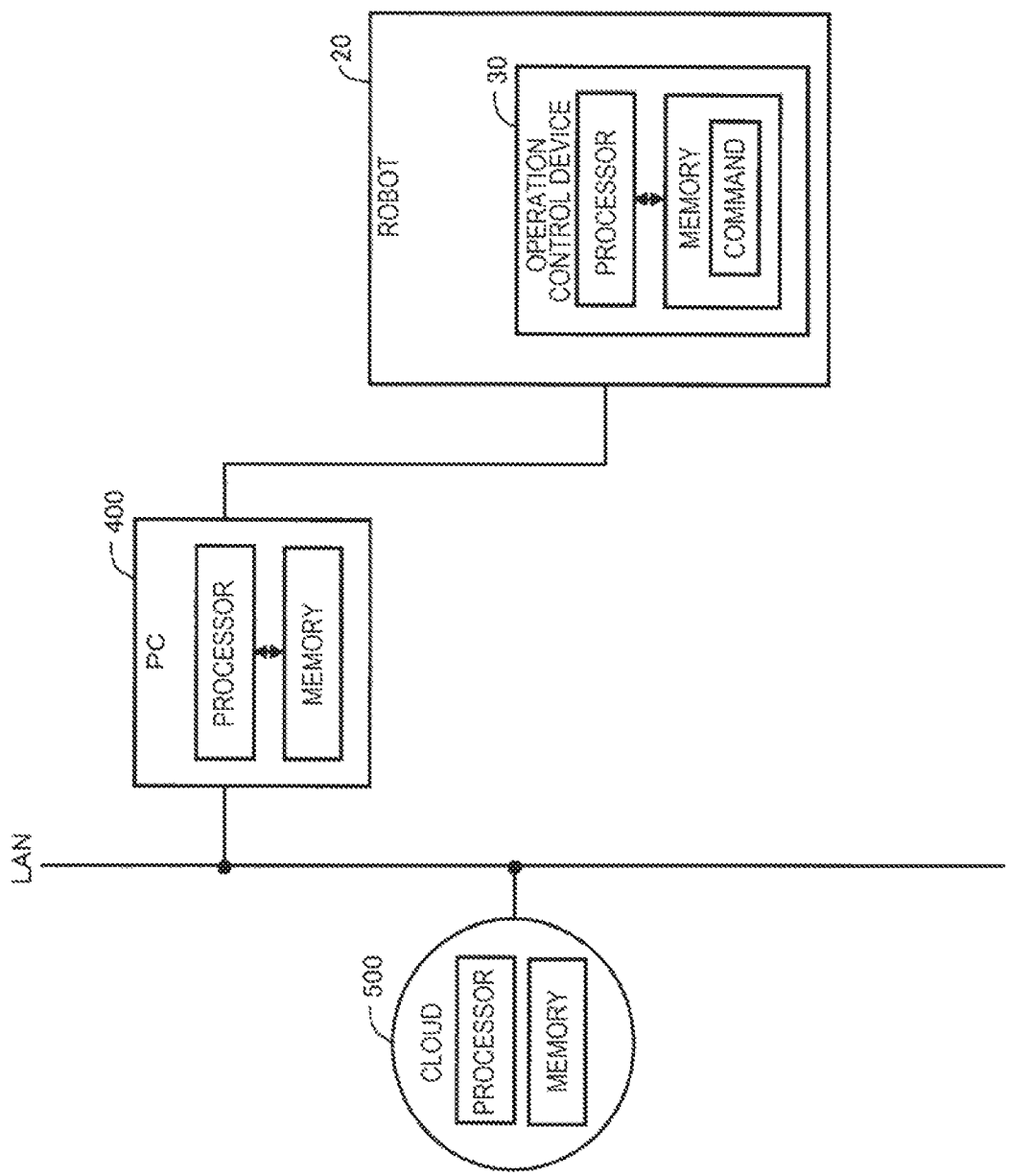
FIG. 15 is a conceptual diagram showing another example in which the control device of the robot is configured by the plurality of processors.

FIG. 15 is a conceptual diagram showing another example in which a control device of a robot is configured by a plurality of processors. This example is different from FIG. 14 in that the operation control device 30 of the robot 20 is housed in the robot 20. In this example as well, it is possible to realize the control device of the robot 20 using a part or all of the plurality of processors. It is possible to realize, using a part or all of a plurality of memories, a storing section that stores various kinds of information.

D. Other Forms

D1. Another Form 1

(1) In the embodiments, the position information Ip, the range information Ir, and the force information If are input as the information specifying the force control (see S140 in FIG. 3 and S540 in FIG. 9) prior to the calculation of the load torques of the joints (see S160 in FIG. 3 and S560 in FIG. 9). However, one or both of moving speed and acceleration of the control point in the force control may be input prior to the calculation of the load torques of the joints. In such a form, values of torques generated in the joints are desirably calculated considering one or both of the input moving speed and the input acceleration. For example, load torques are applied to the joints when acceleration (i.e., a change in speed) is generated at the control point. With such a form, it is possible to more accurately calculate the values of the torques generated in the joints.

(2) In the embodiments, the robot 20 is a six-axis vertical articulated robot. However, the robot controlled by the control device may be other robots such as a SCARA robot and a Cartesian coordinate robot. The arm A may include five or less axes or may include seven or more axes.

(3) In the embodiments, the user inputs the position information to the teaching device 50 via the input device 57 (see S140 in FIG. 3). However, the user may teach the target position St of the target operation to the robot system 1 by manually moving the arm A or by designating a coordinate via the robot control device. The position information representing the position of the target operation may be designated in an orthogonal coordinate system or may be designated by angle positions of the joints.

The user may teach the position where and the posture of the end effector E in which the target operation should be started to the robot system 1 by manually moving the arm A or by designating a coordinate via the robot control device. The position of the TCP where and the posture of the end effector E in which the target operation should be started may be designated in an orthogonal coordinate system or may be designated by angle positions of the joints.

(4) The teaching device 50 is configured such that, in step S140 in the embodiments, any one direction among the six directions, that is, the X-axis direction, the Y-axis direction, the Z-axis direction, the rotating direction around the X axis, the rotating direction around the Y axis, and the rotating direction around the Z axis is selectively input as the direction of the target force (see W11 in FIG. 4). However, the direction of the target force may be specified by a combination of a force component in the X-axis direction, a force component in the Y-axis direction, a force component in the Z-axis direction, a torque component in the direction of the angle position RX, a torque component in the direction of the angle position RY, and a torque component in the direction of the angle position RZ.

(5) In the embodiments, the six-axis force sensor that can simultaneously detect six components including force components in translational three-axis directions and moment components around rotational three axes is attached to the distal end of the arm A (see FIG. 1). However, the force detecting section may be, for example, a three-axis sensor that detects magnitudes of forces on three detection axes orthogonal to one another. In such a form, the direction of the target force fst that can be received by the input window N1 (see FIG. 5 and S520 in FIG. 9) is, for example, any one direction among the three directions, that is, the X-axis direction, the Y-axis direction, and the Z-axis direction in the robot coordinate system RC.

The force detecting section may be provided in another part of the robot other than the distal end of the arm A such as a part between the supporting stand B and the link L1. Further, the function of the force detecting section may be realized by calculating forces in the three-axis directions and torques around the three axes at the TCP from the torques of the motors disposed in the joints of the robot.

(6) In the embodiments, when the load torque of the joint exceeds the allowable torque, the error message EM is displayed to urge reception or reinput of magnitude of a target force with which the load torque of the joint does not exceed the allowable torque (see FIG. 5). However, the robot control device may forcibly change the input magnitude of the target force to the magnitude of the target force with which load torque of the joint does not exceed the allowable torque and then emit, to the user, a message for urging reinput of a setting value or a message indicating that the setting value is changed. The robot control device may perform an output by sound rather than image display (see EM in FIG. 5). The robot control device may cause the user to select, via check in a checkbox, whether to perform a change of an input value by the robot control device.

(7) The storing section that stores various kinds of information may be storing means present in the same housing or may be storing means respectively provided on the insides of a plurality of components communicably connected to one another.

(8) Further, the teaching device 50 may receive time information representing a time in which the force control is continued and determine whether the temperatures of the motors of the joints do not exceed a threshold while the force control is executed. When the force control involves a change of a position, the teaching device 50 may determine, based on an operation time designated in position control, whether the temperatures of the motors of the joint do not exceed the threshold.

(9) In the embodiments, the position information represents the position of the TCP serving as the control point where and the posture of the end effector E in which the target operation should be started. However, the position information may further include information concerning a control point where the target operation should be ended. With such a form, it is possible to more accurately calculate maximum values of the load torques applied to the joints in the target operation including the force control (see S160 in FIG. 3 and S560 in FIG. 9). It is possible to more accurately determine, concerning all the joints J1 to J6, whether the maximum values of the load torques are within the ranges of the allowable torques and the executable candidate points where singular points are absent are present.

(10) In the embodiments, the user interface UI58b representing the ranges considered to be taken in the axial directions is displayed in step S580 in FIG. 9 (see FIG. 13). However, when it is determined that the executable candidate points are present (Yes in S565), the following display may be performed concerning the selected executable candidate points. That is, angle ranges that the joints can take and angle ranges that the joints take in the force control may be displayed like the slider displays S11 to S16 of the user interface UI58b. According to such processing, the user can learn, concerning the positions and the postures of the candidate points, which degrees of margins the angle ranges taken in the force control have with respect to the angles ranges that can be taken.

(11) "The allowable torque of the joint" may be torque obtained by multiplying smaller torque of the allowable torque of the motor of the joint and allowable torque on an output side of a speed reducer by a coefficient (e.g., 0.8 or 0.9) equal to or smaller than 1.

(12) In the embodiments, in step S365 in FIG. 7, the teaching device 50 determines whether the singular points are present among the plurality of representative points included in the operation range specified by the position information and the range information. However, instead of the processing in step S365 in FIG. 7, the teaching device 50 may determine whether the singular points are present among the plurality of representative points included in the operation range specified by the position information and the range information or whether the representative points near the singular points are present among the plurality of representative points. In this form, when such singular points are absent among the representative points, the processing proceeds to step S380 in FIG. 7.

On the other hand, when the singular points are present among the plurality of representative points or the representative points near the singular points are present among the plurality of representative points, the processing proceeds to step S370. In step S370, the teaching device 50 performs the same output as the output shown in FIG. 8 and displays the representative points Rs on the display 58 functioning as the output device 58 together with an error message. In the processing in step S370, the representative points Rs, which are the singular points, are displayed as red points. The representative points Rs present near the singular points are displayed as yellow points. The representative points Rs, which are neither the representative points Rs which are the singular points nor the representative points Rs present near the singular points, are displayed as green points.

The determination concerning whether the representative points near the singular points are present among the plurality of representative points may be performed as explained below. For example, a range of a combination of the position of the TCP near the singular point and the posture of the end effector E may be specified concerning the robot 20. It may be determined whether points included in such a range are present among the plurality of representative points. The position of the TCP and the posture of the end effector E may be changed in a predetermined range based on one or more representative points among the plurality of representative points. The determination explained above may be performed according to whether the singular points are present among the combinations of the positions of the TCP and the postures of the end effector E obtained by changing the position of the TCP and the posture of the end effector E in that way.

For example, when the singular points are present among positions of the TCP obtained by changing the position of the TCP from one representative point by a predetermined amount equal to or smaller than a half of an interval among the representative points, it may be determined that the representative point is the representative point near the singular point. When the singular points are present among a plurality of positions that equally divide a line segment connecting two representative points adjacent to each other, it may be determined that the two representative points adjacent to each other are the representative points near the singular points.

By adopting such a form, when the posture of the robot changes from a certain representative point, which is not the singular point, to another representative point, which is not the singular point, it is possible to reduce likelihood that the robot becomes uncontrollable.

D2. Another Form 2

In the embodiments, the end effector information Ie and the work information Iw are input (see S120 in FIG. 3 and S520 in FIG. 9) prior to the calculation of the load torques of the joints (see S160 in FIG. 3 and S560 in FIG. 9). However, one or both of the end effector information Ie and the work information Iw may not be input. In such a form as well, it is possible to calculate approximate values of torques generated in the joints in the force control specified by the position information and the force information (see S140 in FIG. 3 and S540 in FIG. 9).

D3. Another Form 3

(1) In the embodiments, the work information includes the following information. (i) The information concerning the weight of the work W. (ii) The information concerning the relative positional relation between the center of gravity position of the work W at the time when the work W is gripped by the end effector E in the target operation and the center of gravity position of the end effector E. (iii) The information concerning the relative positional relation between the position of the contact point of the end effector E and the work W at the time when the work W is gripped by the end effector E in the target operation and the center of gravity position of the end effector E.

However, the work information input to the robot control device may not include the information of (iii) explained above. In such a form as well, it is possible to calculate, based on (i) the information concerning the weight of the work W and (ii) the information concerning the relative positional relation between the center of gravity position of the work W and the center of gravity position of the end effector E (see S120 in FIG. 3 and S520 in FIG. 9) and the position information and the force information (see S140 in FIG. 3 and S540 in FIG. 9), approximate values of torques generated in the joints in the force control specified by the position information and the force information (see S140 in FIG. 3 and S540 in FIG. 9).

(2) In the work information, the following information may be input in a robot coordinate system or may be input in a finger coordinate system. (ii) The information concerning the relative positional relation between the center of gravity position of the work W at the time when the work W is gripped by the end effector E in the target operation and the center of gravity position of the end effector E and (iii) the information concerning the relative positional relation between the position of the contact point of the end effector E and the work W at the time when the work W is gripped by the end effector E in the target operation and the center of gravity position of the end effector E. The "hand coordinate system" is a three-dimensional orthogonal coordinate system relatively fixed with respect to the end effector.

D4. Another Form 4

In the embodiments, the range information representing the ranges of the position of the TCP and the posture of the end effector E that could fluctuate in the target operation is input (see S120 in FIG. 3 and S520 in FIG. 9) prior to the calculation of the load torques of the joints (see S160 in FIG. 3 and S560 in FIG. 9). However, the information concerning one or both of the range of the position and the range of the posture in the force control may not be input. In such a form as well, although not throughout the entire target operation, it is possible to calculate values of torques generated in the joints in the force control specified by the position information and the force information (see S140 in FIG. 3 and S540 in FIG. 9).

D5. Another Form 5

In the embodiments, as the error display ED displayed in step S170 in FIG. 3, the error display ED including the error message EM representing the information indicating that the force control is unrealizable and the magnitude fp1 of the target force realizable in the force control is displayed. However, the realizable magnitude of the target force may not be displayed in the error message.

In the error message, the error message representing the information indicating that the force control is unrealizable may not be displayed. In such a form, when the user presses the button B01 after finishing the input to the input windows of the user interface UI12 shown in FIG. 4 (see S120 and S140 in FIG. 3), the following processing can be performed. For example, it is possible to maintain the display of the user interface UI12 shown in FIG. 4 without displaying the error display ED (see FIG. 5) and highlight and display the input window in which the input value should be changed. In that case, it is also possible to output sound to call attention of the user.

D6. Another Form 6

(1) In the embodiments, in step S165 in FIG. 9, the teaching device 50 determines whether the singular points are present among the plurality of representative points included in the operation range specified by the candidate point information and the range information. However, in the processing in determining the candidate position where the force control is realizable (see FIG. 9), it may not be determined, concerning the candidate points, whether the singular points are present among the plurality of representative points.

In such a form, in step S565, the teaching device 50 determines, concerning the candidate points, whether the maximum values of the load torques applied to the joints J1 to J6 are within the ranges of the allowable torques of the joints J1 to J6. The teaching device 50 determines, concerning all the joints J1 to J6, whether the candidate points where the maximum values of the load torques are within the ranges of the allowable torques (i.e., the executable candidate points) are present. When such executable candidate points are absent, the processing proceeds to step S570. When such executable candidate points are present, the processing proceeds to step S580.

(2) In the embodiments, in step S580 in FIG. 9, the executable candidate points are displayed as green points and the candidate points, which are not the executable candidate points, are displayed as red points (see FIG. 11). The three-dimensional convex hull including the set of the executable candidate points is displayed in pale green. However, the three-dimensional convex hull including the set of the executable candidate points may not be displayed. The candidate points, which are not the executable candidate points, may not be displayed. However, the executable candidate points may be output to the output device included in the robot control device.

(3) In the first embodiment, in step S580 in FIG. 9, the user interface UI58b including the slider display S11 is displayed (see FIG. 13). However, the output in determining the candidate position where the force control is realizable may be another form.

FIG. 16 is a diagram showing a user interface UI58c replacing the user interface UI58b (see FIG. 13) in step S580 in FIG. 9. In step S580 in FIG. 9, when one of the executable candidate points R0-0-0 to R4-4-4 in FIG. 11 is clicked via the mouse functioning as the input device 57, the teaching device 50 displays the user interface UI58c shown in FIG. 16 on the display functioning as the output device 58. The user interface UI58c includes output windows W50, W61 to W63, and W71 to W73, an image display DW4, and buttons B27 and B28.

The image display DW4 shows a perspective view representing a state of the robot 20 at the time when the robot 20 takes a posture of the clicked executable candidate point. The output window W50 shows information for identifying the selected executable candidate point. For convenience, "candidate point 1" is displayed.

The output windows W61 to W63 respectively show a position in the X-axis direction, a position in the Y-axis direction, and a position in the Z-axis direction in the robot coordinate system RC of the selected executable candidate point. The output windows W71 to W73 respectively show an angle position in the U-axis direction, an angle position in the V-axis direction, and an angle position in the W-axis direction in the robot coordinate system RC of the selected executable candidate point. In an example shown in FIG. 16, the executable candidate point R4-4-4 is selected. However, FIG. 16 is a diagram for explaining technical content. In FIG. 16, the posture of the robot 20 shown in the image display DW4 and numerical values shown in the output windows W61 to W63 and W71 to W73 do not always match.

The button B28 is a button for returning to the processing of the selection of the executable candidate point via the user interface UI58a. When the button B28 is pressed, the processing returns to the processing of the selection of the executable candidate point via the user interface UI58a.

The button B27 is a button for deciding the executable candidate point. When the button B27 is pressed, the teaching device 50 stores the information input in steps S520 and S540 and candidate point information of the selected executable candidate point in the RAM 50b in association with the information for identifying the target operation. Further, the teaching device 50 outputs the information input in steps S120 and S140 and the candidate point information of the selected executable candidate point to the operation control device 30 together with the information for identifying the target operation. The operation control device 30 stores both the kinds of information in the RAM 30b in association with each other. The operation control device 30 can control the robot 20 later based on the saved those kinds of information.

In such a form as well, in causing the robot 20 to perform the force control, the user can learn, in advance, via the user interface UI58a (see FIG. 11), a point where the force control specified by the magnitude and the direction of the target force can be executed. The user can save, via the user interface UI58c, one of the executable candidate points in the operation control device 30 as a setting value of the force control that the user causes the robot 20 to execute.

(4) In the embodiments, in step S540 in FIG. 9, the information representing the posture is input as a part of the position information and the executable candidate point where the force control can be executed is output (see FIG. 11). However, in step S540, the position DX in the X-axis direction, the position DY in the Y-axis direction, and the position DZ in the Z-axis direction may be input as a part of the position information. In step S580, a range of a posture in which the force control designated by the force information in the positions is executable may be output. An output form may be the same as the slider displays S14 to S16 of the user interface UI58b. With such a form, in performing the force control, the user can learn, in advance, a range of a posture that can be taken in a specific position.

D7. Another Form 7

(1) In the embodiments, the space in which the position where the force control can be realized should be searched is designated as the rectangular parallelepiped (see FIG. 10). However, the space in which the position where the force control can be realized should be searched may be designated as a spherical space centering on a certain point and having a radius of a certain value. A shape such as a column or a polygonal column may be designated as the space in which the position where the force control can be realized should be searched. Further, the space in which the position where the force control can be realized should be searched may be designated as a space obtained by combining those three-dimensional shapes. That is, the receiving section only has to be configured to receive parameters that can specify a space including a plurality of candidate points.

(2) In the embodiments, in step S560 in FIG. 9, the intersections of the points that equally divide the sides of the space Sr of the rectangular parallelepiped specified by the space information into four and the surface parallel to the XY plane, the surface parallel to the YZ plane, and the surface parallel to the ZX plane passing those points are determined as the candidate points. However, the candidate points may be determined by another method. For example, in the processing explained above, another method such as equal division into three, equal division into five, or equal division into ten may be adopted instead of the equal division into four. Intersections of lattices that partition a space at a fixed interval designated by the user may be set as the candidate points. Further, a plurality of candidate points may be determined according to a polar coordinate centering on a certain reference point.

E. Still Another Form

Application Example 1

According to an aspect of the present disclosure, there is provided a robot control device that controls operation of a robot including a force detecting section that detects magnitude of a force applied from an outside. The robot control device includes: a receiving section configured to receive magnitude of a target force in force control performed based on an output of the force detecting section, a direction of the target force, a position where the force control is started, and a posture in which the force control is started; a storing section having stored therein peculiar information including values of a plurality of allowable torques corresponding to a plurality of joints included in the robot; a calculating section configured to calculate, based on the magnitude of the target, the direction of the target force, the position where the force control is started, the posture in which the force control is started, and the peculiar information, values of a plurality of torques generated in the plurality of joints when the force control is executed at the magnitude of the target force and in the direction of the target force in the position where the force control is started and the posture in which the force control is started; and an output control section configured to output information of a first type when the values of the plurality of torques are respectively equal to or smaller than the values of the plurality of allowable torques and output information of a second type when at least one of the values of the plurality of torques exceeds the value of the allowable torque corresponding to the value of the torque.

In such an aspect, in causing the robot to perform the force control, the user can learn, according to whether the information of the first type is output or the information of the second type is output, whether the user can cause the robot to execute force control specified by the magnitude and the direction of the target force input to the robot control device, the start position of the force control, and the posture at the start time of the force control.

Application Example 2

In the robot control device according to the aspect, the receiving section may receive selection information concerning an end effector attached to the robot or a target object processed by the robot, and the calculating section may calculate values of the plurality of torques based on the selection information.

In such an aspect, it is possible to more accurately calculate values of torques generated in the respective joints using the selection information concerning the configurations of the end effector and the target object. Therefore, the user can more accurately learn whether the user can cause the robot to execute force control specified by the magnitude and the direction of the target force input to the robot control device, the start position of the force control, and the posture at the start time of the force control.

Application Example 3

In the robot control device according to the aspect, the selection information may include information concerning relative positions of the end effector and the target object at a time when the end effector grips the target object in the force control.

In such an aspect, in the force control, it is possible to more accurately calculate values of torques generated in the respective joints using the information concerning the relative positions of the end effector and the target object at the time when the end effector grips the target object. Therefore, the user can more accurately learn whether the user can cause the robot to execute force control specified by the magnitude and the direction of the target force input to the robot control device, the start position, and the posture at the start time.

Application Example 4

In the robot control device according to the aspect, the calculating section may calculate values of the plurality of torques based on a range of a position in the force control or a range of a posture in the force control received by the receiving section.

In such an aspect, it is possible to calculate values of torques generated in the respective joints throughout the operation of the force control using the ranges of the position and the posture in the force control. Therefore, the user can more accurately learn whether the user can cause the robot to execute force control specified by the magnitude and the direction of the target force input to the robot control device, the start position, and the posture at the start time.

Application Example 5

In the robot control device according to the aspect, the information of the second type may include information indicating that force control specified by the magnitude of the target force or the direction of the target force, the position where the force control is started, and the posture in which the force control is started is unrealizable or information indicating realizable magnitude of the target force in force control specified by the direction of the target force and the position where the force control is started or the posture in which the force control is started.

In such an aspect, when information indicating that the force control is unrealizable is output, the user can learn that the user cannot cause the robot to execute the force control specified by the magnitude and the direction of the target force input to the robot control device, the start position, and the posture at the start time.

When the realizable magnitude of the target force is output, the user can learn magnitude of a force that the user can cause the robot to realize in the force control specified by the direction of the target force input to the robot control device, the start position, and the posture at the start time.

Application Example 6

According to an aspect of the present disclosure, there is provided a robot control device that controls operation of a robot including a force detecting section that detects magnitude of a force applied from an outside. The robot control device includes: a receiving section configured to receive magnitude of a target force in force control performed based on an output of the force detecting section and a direction of the target force; a storing section having stored therein peculiar information including values of a plurality of allowable torques corresponding to a plurality of joints included in the robot; a calculating section configured to calculate, based on the magnitude of the target force, the direction of the target force, and the peculiar information, concerning a plurality of candidate points serving as candidate of a position where the force control is started, values of a plurality of torques generated in the plurality of joints included in the robot when the force control is started at the magnitude of the target force and in the direction of the target force from the candidate points; and an output control section configured to output the candidate points where the values of the plurality of torques are respectively equal to or smaller than the values of the plurality of allowable torques among the plurality of candidate points.

In such an aspect, in causing the robot to perform the force control, the user can learn, in advance, candidate points where force control specified by the magnitude and the direction of the target force can be executed.

Application Example 7

In the robot control device according to the aspect, the receiving section may receive selection information concerning a configuration of an end effector attached to the robot or a target object processed by the robot, and the calculating section may calculate values of the plurality of torques based on the selection information.

In such an aspect, it is possible to more accurately calculate values of torques generated in the respective joints using the selection information concerning the configurations of the end effector and the target object. Therefore, the user can more accurately learn a position where force control specified by the magnitude and the direction of the target force can be executed.

Application Example 8

In the robot control device according to the aspect, the selection information may include information concerning relative positions of the end effector and the target object at a time when the end effector grips the target object in the force control.

In such an aspect, in the force control, it is possible to more accurately calculate values of torques generated in the respective joints using the information concerning the relative positions of the end effector and the target object at the time when the end effector grips the target object. Therefore, the user can more accurately learn a position where force control specified by the magnitude and the direction of the target force can be executed.

Application Example 9

In the robot control device according to the aspect, the calculating section may calculate values of the plurality of torques based on a range of a position in the force control or a range of a posture in the force control received by the receiving section.

In such an aspect, it is possible to calculate values of torques generated in the respective joints throughout the operation of the force control using the ranges of the position and the posture in the force control. Therefore, the user can more accurately learn a position where force control specified by the magnitude and the direction of the target force can be executed.

Application Example 10

In the robot control device according to the aspect, the receiving section may receive designation of a space including the plurality of candidate points, and the calculating section may determine the plurality of candidate points in the space.

In such an aspect, compared with when the designation of the space including the plurality of candidate points is not received, it is possible to determine, with a smaller processing load, a position where a value of torque generated in a joint is equal to or smaller than a value of allowable torque.

Application Example 11

There is provided a robot system including: the robot control device according to the aspect; and the robot controlled by the robot control device.

Not all of the plurality of components in the aspects of the present disclosure explained above are essential. In order to solve a part or all of the problems described above or achieve a part or all of the effects described in this specification, concerning a part of the plurality of components, it is possible to perform a change, deletion, replacement with new other components, and partial deletion of limited content of the part of the plurality of components. In order to solve a part or all of the problems described above or achieve a part or all of the effects described in this specification, it is also possible to combine a part or all of the technical features included in one aspect of the present disclosure described above with a part or all of the technical features included in the other aspects of the present disclosure to form one independent aspect of the present disclosure.

What is claimed is:

1. A robot control device that controls operation of a robot including a force sensor that detects magnitude of a force applied from an outside,
the robot control device comprising a processor, wherein the processor is configured to:
receive magnitude of a target force in force control performed based on an output of the force sensor, a direction of the target force, a position where the force control is started, and a posture in which the force control is started;
calculate, based on the magnitude of the target force, the direction of the target force, the position where the force control is started, the posture in which the force control is started, and peculiar information including values of a plurality of allowable torques corresponding to a plurality of joints included in the robot, values of a plurality of torques generated in the plurality of joints when the force control is executed at the magnitude of the target force and in the direction of the target force in the position where the force control is started and the posture in which the force control is started;
output information of a first type when the values of the plurality of torques are respectively equal to or smaller than the values of the plurality of allowable torques; and output information of a second type when at least one of the values of the plurality of torques exceeds the value of the allowable torque corresponding to the value of the torque.

2. The robot control device according to claim 1, wherein the processor is configured to:
receive selection information concerning an end effector attached to the robot or a target object processed by the robot; and
calculate values of the plurality of torques based on the selection information.

3. The robot control device according to claim 2, wherein the selection information includes information concerning relative positions of the end effector and the target object at a time when the end effector grips the target object in the force control.

4. The robot control device according to claim 1, wherein the processor is configured to calculate values of the plurality of torques based on a range of a position in the force control or a range of a posture in the force control.

5. The robot control device according to claim 1, wherein the information of the second type includes information indicating that force control specified by the magnitude of the target force or the direction of the target force, the position where the force control is started, and the posture in which the force control is started is unrealizable or information indicating realizable magnitude of the target force in force control specified by the direction of the target force and the position where the force control is started or the posture in which the force control is started.

6. A robot control device that controls operation of a robot including a force detecting section that detects magnitude of a force applied from an outside,
the robot control device comprising a processor, wherein the processor is configured to:
receive magnitude of a target force in force control performed based on an output of the force detecting section and a direction of the target force;
store therein peculiar information including values of a plurality of allowable torques corresponding to a plurality of joints included in the robot;
calculate, based on the magnitude of the target, the direction of the target force, and the peculiar information, concerning a plurality of candidate points serving as candidate of a position where the force control is started, values of a plurality of torques generated in the plurality of joints included in the robot when the force control is started at the magnitude of the target force and in the direction of the target force from the candidate points; and
output the candidate points where the values of the plurality of torques are respectively equal to or smaller than the values of the plurality of allowable torques among the plurality of candidate points.

7. The robot control device according to claim 6, wherein the processor is configured to:
receive selection information concerning a configuration of an end effector attached to the robot or a target object processed by the robot; and
calculate values of the plurality of torques based on the selection information.

8. The robot control device according to claim 7, wherein the selection information includes information concerning relative positions of the end effector and the target object at a time when the end effector grips the target object in the force control.

9. The robot control device according to claim 6, wherein the processor is configured to calculate values of the plurality of torques based on a range of a position in the force control or a range of a posture in the force control received by the receiving section.

10. The robot control device according to claim 6, wherein
the processor is configured to:
receive designation of a space including the plurality of candidate points; and
determine the plurality of candidate points in the space.

11. A robot system comprising:
a robot including a force detecting section that detects magnitude of a force applied from an outside,
a robot control device controlling the robot,
wherein the robot control device includes a processor, and the processor is configured to:
receive magnitude of a target force in force control performed based on an output of the force sensor, a direction of the target force, a position where the force control is started, and a posture in which the force control is started;
calculate, based on the magnitude of the target force, the direction of the target force, the position where the force control is started, the posture in which the force control is started, and peculiar information including values of a plurality of allowable torques corresponding to a plurality of joints included in the robot, values of a plurality of torques generated in the plurality of joints when the force control is executed at the magnitude of the target force and in the direction of the target force in the position where the force control is started and the posture in which the force control is started;
output information of a first type when the values of the plurality of torques are respectively equal to or smaller than the values of the plurality of allowable torques; and
output information of a second type when at least one of the values of the plurality of torques exceeds the value of the allowable torque corresponding to the value of the torque.

* * * * *